United States Patent
Kim et al.

(10) Patent No.: US 12,126,902 B2
(45) Date of Patent: Oct. 22, 2024

(54) PROCESSOR FOR IMAGE STABILIZATION BASED ON ARTIFICIAL INTELLIGENCE AND DEVICE INCLUDING THE SAME

(71) Applicant: DEEPX CO., LTD., Seongnam-si (KR)

(72) Inventors: Lok Won Kim, Seongnam-si (KR); You Jun Kim, Suwon-si (KR)

(73) Assignee: DEEPX CO., LTD., Seongnam-si (KR)

(*) Notice: Subject to any disclaimer, the term of this patent is extended or adjusted under 35 U.S.C. 154(b) by 0 days.

(21) Appl. No.: 18/212,684

(22) Filed: Jun. 21, 2023

(65) Prior Publication Data
US 2023/0353874 A1 Nov. 2, 2023

Related U.S. Application Data

(63) Continuation of application No. 17/885,569, filed on Aug. 11, 2022, now Pat. No. 11,750,927.

(30) Foreign Application Priority Data

Aug. 12, 2021 (KR) .................. 10-2021-0106909
May 26, 2022 (KR) .................. 10-2022-0064967

(51) Int. Cl.
*H04N 23/68* (2023.01)
*G06F 18/21* (2023.01)
(Continued)

(52) U.S. Cl.
CPC ......... *H04N 23/683* (2023.01); *G06F 18/217* (2023.01); *G06N 3/063* (2013.01);
(Continued)

(58) Field of Classification Search
CPC .............. H04N 23/683; H04N 23/6812; H04N 23/685; H04N 23/687; H04N 23/667;
(Continued)

(56) References Cited

U.S. PATENT DOCUMENTS 8,228,383 B2 * 7/2012 Sugiura ................ H04N 23/611
348/169
9,628,713 B2 4/2017 Lloyd et al.
(Continued)

FOREIGN PATENT DOCUMENTS

KR 10-2017-0089992 A 8/2017
KR 10-2019-0104104 A 9/2019
(Continued)

OTHER PUBLICATIONS

Bi-directional VCM driver for Auto focus, TSZ02201-0K1K0B601860-1-2, Oct. 6, 2016 Rev.003.

*Primary Examiner* — Michael S Osinski
(74) *Attorney, Agent, or Firm* — INVENSTONE PATENT, LLC

(57) ABSTRACT

A method for stabilizing an image based on artificial intelligence includes acquiring tremor detection data with respect to the image, the tremor detection data acquired from two or more sensors; outputting stabilization data for compensating for an image shaking, the stabilization data outputted using an artificial neural network (ANN) model trained to output the stabilization data based on the tremor detection data; and compensating for the image shaking using the stabilization data. A camera module includes a lens; an image sensor to output an image captured through the lens; two or more sensors to output tremor detection data with respect to the image; a controller to output stabilization data based on the tremor detection data using an ANN model; and a stabilization unit to compensate for an image shaking using the stabilization data. The ANN model is trained to output the stabilization data based on the tremor detection data.

16 Claims, 16 Drawing Sheets

(51) Int. Cl.
*G06N 3/063* (2023.01)
*G06N 3/08* (2023.01)
*G06N 5/04* (2023.01)

(52) U.S. Cl.
CPC ............... *G06N 3/08* (2013.01); *G06N 5/04* (2013.01); *H04N 23/6812* (2023.01)

(58) Field of Classification Search
CPC ...... H04N 23/64; H04N 23/69; H04N 23/695; H04N 23/54; H04N 23/55; G06F 18/217; G06N 3/063; G06N 3/08; G06N 5/04; G06N 20/20; G06N 3/04; G06N 3/045; G06N 3/084; G06N 3/044; G06N 3/0464; G06N 9/092; G02B 27/646; G03B 5/00; G03B 2205/0069; G03B 2205/0007; G03B 2205/0015; G03B 2217/005; G06T 2207/20084; G06T 5/50; G06T 2207/10016; G06T 2207/20081; G06T 2207/20201; G06T 5/001; G06V 10/82; G06V 10/12; H02K 41/0356
See application file for complete search history.

(56) References Cited

U.S. PATENT DOCUMENTS

| | | | |
|---|---|---|---|
| 10,453,220 | B1 | 10/2019 | Mihal et al. |
| 10,936,916 | B1 | 3/2021 | Rahnama-Moghaddam et al. |
| 11,032,477 | B2 | 6/2021 | Jo et al. |
| 11,159,722 | B2 | 10/2021 | An et al. |
| 11,558,553 | B2 | 1/2023 | Song et al. |
| 11,611,703 | B2 | 3/2023 | Moon et al. |
| 11,914,801 | B2 * | 2/2024 | Tekalur ................ G06F 3/0338 |
| 11,924,550 | B2 * | 3/2024 | Kim ...................... G06T 5/60 |
| 11,991,447 | B2 * | 5/2024 | Tabuchi .................. G03B 5/02 |
| 2011/0043646 | A1 | 2/2011 | Watanabe et al. |
| 2016/0224892 | A1 | 8/2016 | Sawada et al. |
| 2016/0366339 | A1 | 12/2016 | Shimoyama |
| 2017/0041543 | A1 | 2/2017 | Kikuchi |
| 2017/0155840 | A1 | 6/2017 | Manabe |
| 2017/0155845 | A1 | 6/2017 | Manabe |
| 2017/0214853 | A1 | 7/2017 | Koyano |
| 2017/0228618 | A1 | 8/2017 | Jiang et al. |
| 2018/0184005 | A1 * | 6/2018 | Morotomi .......... H04N 23/6812 |
| 2018/0268286 | A1 | 9/2018 | Dasgupta |
| 2019/0260938 | A1 | 8/2019 | Tanaka |
| 2019/0373170 | A1 * | 12/2019 | Fujita .................... H04N 23/651 |
| 2020/0380658 | A1 | 12/2020 | Yang |
| 2021/0099642 | A1 | 4/2021 | Ogawa |
| 2021/0132327 | A1 | 5/2021 | Sharma et al. |
| 2021/0166060 | A1 | 6/2021 | Wang et al. |
| 2021/0199911 | A1 | 7/2021 | Shimizu |
| 2021/0247531 | A1 | 8/2021 | Kim et al. |
| 2021/0321039 | A1 | 10/2021 | Kim et al. |
| 2021/0360160 | A1 | 11/2021 | Watanabe |
| 2021/0385383 | A1 | 12/2021 | Kim et al. |
| 2022/0132023 | A1 | 4/2022 | Kagaya et al. |
| 2022/0180185 | A1 * | 6/2022 | Kale ..................... G06F 18/217 |
| 2022/0303469 | A1 | 9/2022 | Fujiwara |
| 2022/0306130 | A1 | 9/2022 | Loghin |
| 2023/0018004 | A1 | 1/2023 | Wen et al. |
| 2023/0022444 | A1 * | 1/2023 | Lee ..................... H04N 23/683 |
| 2023/0050618 | A1 | 2/2023 | Kim et al. |
| 2023/0112139 | A1 | 4/2023 | Tekalur et al. |
| 2023/0147581 | A1 * | 5/2023 | Sumioka ................ H02N 2/062 348/208.7 |
| 2024/0147069 | A1 * | 5/2024 | Chen .................... H04N 23/687 |

FOREIGN PATENT DOCUMENTS

| | | |
|---|---|---|
| KR | 10-2020-0110906 A | 9/2020 |
| KR | 10-2021-0020966 A | 2/2021 |
| KR | 10-2241321 B1 | 4/2021 |

* cited by examiner

PROCESSOR FOR IMAGE STABILIZATION BASED ON ARTIFICIAL INTELLIGENCE AND DEVICE INCLUDING THE SAME

CROSS-REFERENCE TO RELATED APPLICATIONS

This application is a continuation of U.S. patent application Ser. No. 17/885,569, filed on Aug. 11, 2022, which claims the priority of Korean Patent Application No. 10-2021-0106909 filed on Aug. 12, 2021 and Korean Patent Application No. 10-2022-0064967 filed on May 26, 2022, in the Korean Intellectual Property Office, the disclosures of which is incorporated herein by reference.

BACKGROUND OF THE DISCLOSURE

Technical Field

The present invention relates to a method for image stabilization and a camera module therefor, and particularly, to a method for artificial intelligence-based image stabilization and a camera module therefor.

Background Art

An image captured by a camera may become blurred due to, for example, a shaking (tremor) of a user's hand. To solve this, an image stabilizer (IS) is typically applied to the camera of a camera module to compensate for camera shake.

An image stabilization technique may use an optical image stabilizer (OIS) and an image sensor. The camera module to which OIS technology is applied detects vibration (image shake) through a navigation sensor such as a gyro sensor and generates a compensation signal using a Hall sensor that detects a change in separation between a coil and a magnet. Based on the compensation signal, the image shake is stabilized.

In particular, the camera module may compensate for vibration by using one of a lens shift method, in which the image sensor is fixed and the lens is shifted to compensate for vibration, and a camera rotation method in which the image sensor and the lens are simultaneously tilted to compensate for vibration.

SUMMARY OF THE DISCLOSURE

An OIS system may be implemented as an OIS system to which a lens and an image sensor are both fixed, which is a camera-tilt architecture type OIS system. Alternatively, an OIS system may be implemented as an OIS system to which only an image sensor is fixed, which is a barrel-shift architecture type OIS system.

The camera-tilt architecture type OIS system, which may include a photo sensor and an actuator, stabilizes image shaking by tilting the structure to which the lens and image sensor are fixed such that the lens and image sensor are tilted together, i.e., at the same time. On the other hand, the barrel-shift architecture type OIS system, which may include an actuator, a Hall sensor, and a magnet, stabilizes image shaking by shifting a lens using a magnet.

The above OIS systems perform stabilization using a simple feedback algorithm that generates a stabilization signal based on the detection signals of sensors that detect image shaking.

The inventors of the present disclosure have recognized that if stabilization is performed using such a simple feedback algorithm, the performance of the algorithm may be limited.

Accordingly, an object of the present disclosure is to provide an artificial intelligence-based image stabilization method capable of maximizing the processing speed of an operation for compensating for image shaking and reducing power consumption, and to provide a camera module using the method.

Another object of the present disclosure is to provide an artificial intelligence-based image stabilization method capable of maximizing the processing speed of an operation for compensating for image shaking and reducing power consumption, and to provide a processor using the method.

Another object of the present disclosure is to provide an artificial intelligence-based image stabilization method capable of compensating for a plurality of tremor patterns in various usage environments through artificial intelligence reinforcement learning, and to provide a processor using the method.

Another object of the present disclosure is to provide an artificial intelligence-based image stabilization method and an apparatus capable of maximizing the processing speed of an operation for compensating for image shaking and reducing power consumption through artificial intelligence training.

Another object of the present disclosure is to provide an artificial intelligence-based image stabilization method and an apparatus capable of maximizing the processing speed of an operation for compensating for image shaking and reducing power consumption by training a specific pattern using an artificial intelligence technique.

The present disclosure is not limited to the above objects, and other problems will be clearly understood by those skilled in the art from the following description.

According to one aspect of the present disclosure, a method for stabilizing an image based on artificial intelligence (AI) is provided. The method may include acquiring tremor detection data with respect to the image, the tremor detection data acquired from two or more sensors; outputting stabilization data for compensating for an image shaking, the stabilization data outputted using an artificial neural network (ANN) model trained to output the stabilization data based on the tremor detection data; and compensating for the image shaking using the stabilization data.

The ANN model may be based on reinforcement learning.

The tremor detection data may include a signal to detect position change of a camera module and a lens.

The two or more sensors may include a gyro sensor and a Hall sensor.

The ANN model is a trained model so that an error value due to the image shaking approaches a predetermined value based on training data for learning.

The ANN model may be configured to output a control signal for controlling a movement of a lens included in a camera module to compensate for the image shaking by receiving the tremor detection data as an input.

The ANN model may be configured to output a control signal for controlling a movement of an image sensor included in a camera module to compensate for the image shaking by receiving the tremor detection data as an input.

The ANN model may be configured to receive the tremor detection data as an input to simultaneously perform a training operation for inferencing the stabilization data and an inference operation regarding to the stabilization data.

The ANN model may include an input node to which the tremor detection data is input; a hidden layer for performing an AI operation of the input node; and an output node to outputting the stabilization data.

According to another aspect of the present disclosure, a camera module is provided. The camera module may include a lens; an image sensor configured to output an image captured through the lens; two or more sensors configured to output tremor detection data with respect to the image; a controller configured to output stabilization data based on the tremor detection data using an artificial neural network (ANN) model; and a stabilization unit configured to compensate for an image shaking using the stabilization data, wherein the ANN model is trained to output the stabilization data based on the tremor detection data.

The tremor detection data may include a signal detected by an x-axis and y-axis rotational movement of a gyro sensor and an x-axis and y-axis rotational movement of a Hall sensor.

The two or more sensors may include at least two of a gyro sensor, a Hall sensor, and a photo sensor. The ANN model may be trained according to the tremor detection data such that an error value due to the image shaking approaches a predetermined value. The error value may be based on a difference between the x-axis movement of the gyro sensor and the x-axis movement of the Hall sensor and a difference between the y-axis movement of the gyro sensor and the y-axis movement of the Hall sensor. The trained model may include a first model trained to infer the stabilization data in which the error value approaches the predetermined value, based on the tremor detection data; and a second model trained to criticize a result of the stabilization data. The controller may be further configured to collect the error value through the training and to update the ANN model using the collected error value.

The camera module may further include a temperature sensor for sensing a temperature, and the controller may be further configured to output the stabilization data based on the tremor detection data and temperature data acquired through the temperature sensor.

The tremor detection data may include a signal detected by an x-axis and y-axis rotational movement of a gyro sensor and by an x-axis, y-axis, and z-axis rotational movement of a Hall sensor, and the controller may be further configured to obtain a defocus amount data from a frequency component of the image and to output the stabilization data based on the tremor detection data and the defocus amount data.

The ANN model may be configured to use modulation transfer function (MTF) data of the image as training data for training.

According to the present disclosure, by inferring a compensation signal used to compensate for image shaking using an artificial neural network (ANN) model, it is possible to maximize the stabilization speed and reduce power consumption.

In addition, according to the present disclosure, an image stabilization method with improved accuracy can be provided by compensating for image shaking in consideration of various variables such as temperature, defocus amount, a modulation transfer function (MTF) of the image, and the like as well as the detection signal of the sensor using an artificial neural network model.

In addition, according to the present disclosure, it is possible to provide an image stabilization method with improved efficiency by performing focus adjustment as well as image stabilization.

In addition, according to the present disclosure, image stabilization can be quickly provided through a processor that processes a trained artificial neural network model.

In addition, according to the present disclosure, it is possible to reduce power consumption while rapidly providing image stabilization through an inference dedicated processor that processes a trained artificial neural network model.

In addition, according to the present disclosure, image stabilization can be performed through a plurality of tremor patterns of various usage environments trained by artificial intelligence reinforcement learning.

DETAILED DESCRIPTION OF THE EMBODIMENT

Figure 1:
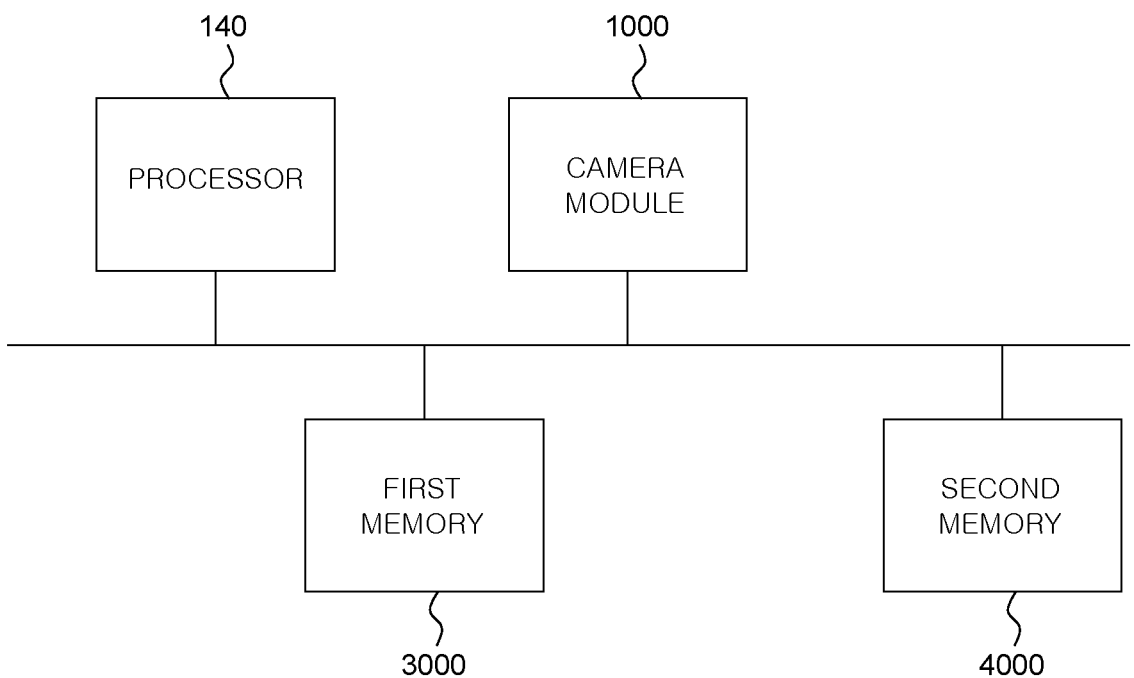
FIG. 1 is a schematic conceptual diagram illustrating an apparatus including a camera module according to an example of the present disclosure.

Particular structural or step-by-step descriptions for examples according to the concept of the present disclosure disclosed in the present disclosure or application are merely exemplified for the purpose of explaining the examples according to the concept of the present disclosure.

Examples according to the concept of the present disclosure may be embodied in various forms, and should not be construed as being limited to the examples described in the present disclosure or application.

Since the examples according to the concept of the present disclosure may have various modifications and may have various forms, specific examples will be illustrated in the drawings and described in detail in the present disclosure or application. However, this is not intended to limit the examples according to the concept of the present disclosure with respect to the specific disclosure form, and should be understood to include all modifications, equivalents, and substitutes included in the spirit and scope of the present disclosure.

Terms such as first and/or second may be used to describe various elements, but the elements should not be limited by the terms.

The above terms are only for the purpose of distinguishing one element from another element, for example, without departing from the scope according to the concept of the present disclosure, and a first element may be termed a second element, and similarly, a second element may also be termed a first element.

When an element is referred to as being "connected to" or "in contact with" another element, it is understood that the element may be directly connected to or in contact with another element, but other elements may be disposed therebetween. On the other hand, when it is mentioned that a certain element is "directly connected to" or "directly in contact with" another element, it should be understood that no other element is present therebetween.

Other expressions describing the relationship between elements, such as "between" and "immediately between" or "adjacent to" and "directly adjacent to", etc., should be interpreted similarly.

In this document, expressions such as "A or B", "at least one of A or/and B", or "one or more of A or/and B" may include all possible combinations of the items listed together. For example, "A or B", "at least one of A and B", or "at least one of A or B" can refer to all instances of (1) including at least one A, (2) including at least one B, or (3) including both at least one A and at least one B.

As used herein, expressions such as "first," "second," "first," or "second," may modify various elements, regardless of order and/or importance. In addition, it is used only to distinguish one component from other components, and does not limit the components.

For example, the first user equipment and the second user equipment may represent different user equipment regardless of order or importance. For example, without departing from the scope of rights described in this document, the first component may be named as the second component, and similarly, the second component may also be renamed as the first component.

Terms used in present disclosure are only used to describe specific examples, and may not be intended to limit the scope of other examples.

The singular expression may include the plural expression unless the context clearly dictates otherwise. Terms used herein, including technical or scientific terms, may have the same meanings as commonly understood by one of ordinary skill in the art described in this document.

Among terms used in this document, terms defined in a general dictionary may be interpreted to have the same or similar meaning to the meaning in the context of the related art. Also, unless explicitly defined in this document, it should not be construed in an ideal or overly formal sense. In some cases, even terms defined in this document cannot be construed to exclude examples of this document.

The terms used herein are used only to describe specific examples, and are not intended to limit the present disclosure.

The singular expression includes the plural expression unless the context clearly dictates otherwise. In this specification, terms such as "comprise" or "have" are intended to designate the presence of a stated feature, number, step, action, component, part, or combination thereof. Accordingly, it should be understood that the existence or addition of one or more other features or numbers, steps, operations, components, parts, or combinations thereof, is not precluded.

Unless defined otherwise, all terms used herein, including technical or scientific terms, have the same meaning as commonly understood by one of ordinary skill in the art to which this disclosure pertains.

Terms such as those defined in a commonly used dictionary should be interpreted as having a meaning consistent with the meaning in the context of the related art, and should not be interpreted in an ideal or excessively formal meaning unless explicitly defined in the present disclosure.

Each feature of various examples of the present disclosure can be partially or wholly combined or combined with each other, and technically various interlocking and driving are possible as those skilled in the art will fully understand. In addition, each example may be implemented independently of each other or may be implemented together in a related relationship.

In describing the examples, descriptions of technical contents that are well known in the technical field to which the present disclosure pertains and are not directly related to the present disclosure may be omitted. This is to more clearly convey the gist of the present disclosure without obscuring the gist of the present disclosure by omitting unnecessary description.

Hereinafter, the present disclosure will be described in detail by describing preferred examples of the present disclosure with reference to the accompanying drawings. Hereinafter, examples of the present disclosure will be described in detail with reference to the accompanying drawings.

FIG. 1 illustrates an apparatus including a camera module according to an example of the present disclosure.

Referring to FIG. 1, an apparatus A may include a camera module 1000, a processor 140, and a first memory 3000. According to various examples, the apparatus A may be configured to further include a second memory 4000 separate from the first memory 3000. That is, the apparatus A may be configured to selectively include or exclude the second memory 4000.

The camera module 1000 is a unit for capturing an image, and may include an OIS system for detecting and compensating for image shaking. For example, the OIS system may include two or more sensors for detecting the image shaking and compensation units for compensating for the image shaking.

In particular, the OIS system may include a processor 140 that is an arithmetic unit. The processor 140 may be implemented with various modifications.

For example, the processor 140 may be a computing device such as a central processing unit (CPU) or an application processor (AP).

For example, the processor 140 may be a computing device such as a micro processing unit (MPU).

For example, the processor 140 may be a computing device such as a micro controller unit (MCU).

For example, the processor 140 may be a computing device such as a neural processing unit (NPU).

For example, the processor 140 may be a computing device such as an image signal processor (ISP).

For example, the processor 140 may be a system on chip (SoC) in which various computing devices such as a CPU and an NPU are integrated.

For example, the processor 140 may be implemented in the form of an integrated chip (IC) in which the above-described computing devices are integrated. However, examples of the present disclosure are not limited to the processor 140.

The processor 140 may operatively communicate with the camera module 1000 and the first memory 3000. Additionally, the processor 140 may be in operative communication with the second memory 4000.

The processor 140 may correspond to a computing device such as a CPU or an AP. In addition, the processor 140 may be implemented in the form of an integrated chip such as an SoC in which various computing devices such as CPU, GPU, and NPU are integrated. In various examples, the processor 140 may operate as a computing device of the OIS system.

The processor 140 may be implemented in the form of an integrated chip in which various arithmetic devices such as a CPU and an ISP are integrated. Such an ISP may receive a Bayer patten, which is an output image of the camera module, and may output data converted into an RGB or YUV image.

That is, the processor 140 according to examples of the present disclosure may refer to a dedicated processor and/or integrated heterogeneous processors.

The camera module 1000 may be implemented in the form of an integrated chip integrated with the processor 140.

The first memory 3000 is a memory mounted on a semiconductor die and may be a memory for caching or storing data processed in the on-chip region. The first memory 3000 may include a memory such as ROM, SRAM, DRAM, resistive RAM, magneto-resistive RAM, phase-change RAM, ferroelectric RAM, flash memory, or high bandwidth memory (HBM). The first memory 3000 may include at least one memory unit. The first memory 3000 may be configured as a homogeneous memory unit or a heterogeneous memory unit.

The first memory 3000 may be configured as an internal memory or an on-chip memory.

The second memory 4000 may include a memory such as ROM, SRAM, DRAM, resistive RAM, magneto-resistive RAM, phase-change RAM, ferroelectric RAM, flash memory, or HBM. The second memory 4000 may include at least one memory unit. The second memory 4000 may be configured as a homogeneous memory unit or a heterogeneous memory unit.

The second memory 4000 may be configured as a main memory or an off-chip memory.

Hereinafter, the camera module 1000 will be described in detail with reference to FIG. 2, which illustrates a camera module according to an example of the present disclosure.

Figure 2:
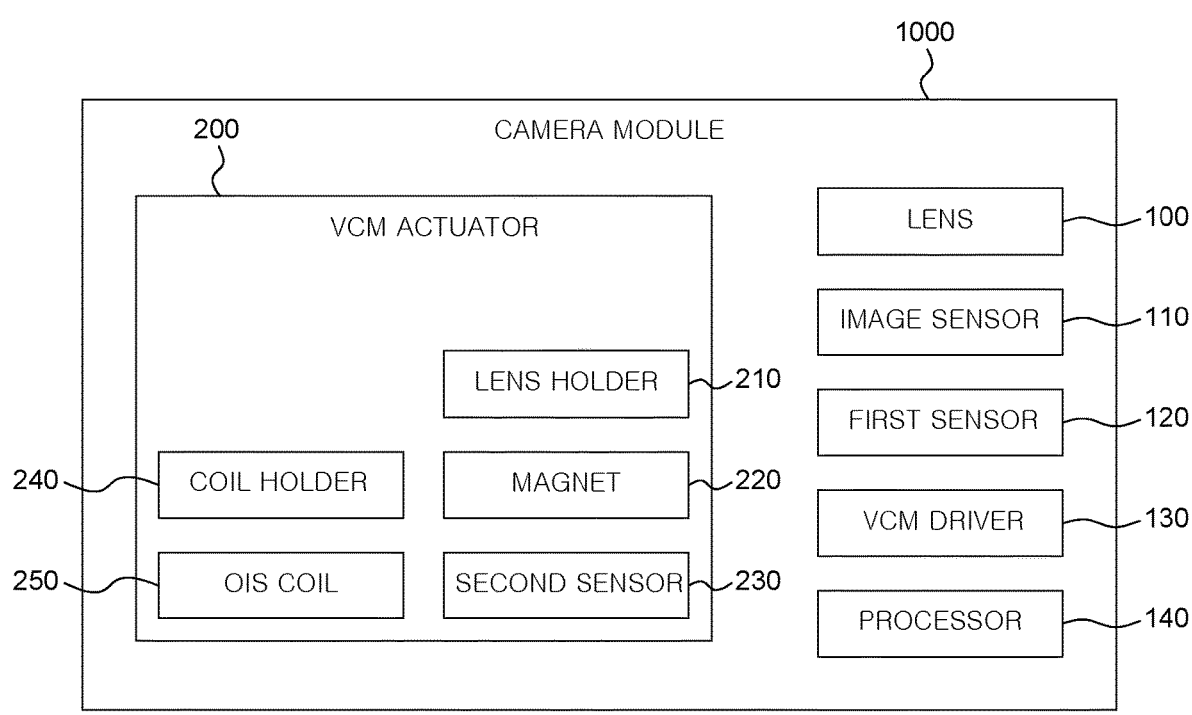
FIG. 2 is a schematic conceptual diagram illustrating a camera module according to an example of the present disclosure.

Referring to FIG. 2, the camera module 1000 may include a lens 100, an image sensor 110, a first sensor 120, a voice coil motor (VCM) driver 130, a processor 140, and a VCM actuator 200.

However, the processor 140 may be included in the camera module 1000, as shown in FIG. 1, or configured to be disposed outside the camera module 1000. That is, the processor 140 of FIG. 2 may be excluded from the camera module 1000, and the processor 140 may be configured to communicate with the camera module 1000 from the outside.

The lens 100 is configured to form an optical image while collecting or distributing light coming from an object. The image sensor 110 is a component that converts light received through a lens into a digital signal, and may include a charge-coupled device (CCD) sensor, a complementary metal oxide semiconductor (CMOS) sensor, and the like.

The first sensor 120 is a sensor for detecting the shaking of the camera module 1000 or the apparatus A. The first sensor 120 may be an angular velocity sensor that measures the rotational speed of an object, such as a gyro sensor. In other words, the movement signal obtained through the first sensor 120 may include information on the x-axis movement and the y-axis movement of the first sensor 120.

The VCM driver 130 may be configured to transmit a control signal to the VCM actuator 200 to correctly adjust the position of the lens 100.

The VCM actuator 200 may include a lens holder 210, a magnet 220, a second sensor 230, a coil holder 240, and a coil 250.

Specifically, the lens holder 210 may be configured to mount the lens 100, and the magnet 220 may be configured to adjust the position of the lens 100 using a magnetic force.

The second sensor 230 is a sensor for detecting shaking of the VCM actuator 200, and may be a Hall sensor for detecting a change in separation between the OIS coil 250 and the magnet 220.

The coil holder 240 may be configured such that the OIS coil 250 is mounted on the coil holder 240 and such that the OIS coil 250 is disposed opposite the magnet 220 to control the magnetic force of the magnet 220.

The processor 140 may be configured to process the overall operation of the camera module 1000 in consideration of the lens 100, the image sensor 110, the first sensor 120, the voice coil motor (VCM) driver 130, and the VCM actuator 200.

In particular, the processor 140 may be configured to perform an operation for compensating for image shaking using an artificial neural network (ANN).

Specifically, the processor 140 may obtain a movement signal (i.e., a tremor detection signal) from two or more sensors (i.e., at least the first sensor 120 and the second sensor 230) included in the camera module 1000, respectively. The processor 140 may generate an inferred compensation signal using an ANN model trained to infer a compensation signal for compensating for image shaking based on each obtained movement signal. The image shaking may be compensated based on the compensation signal inferred by the processor 140.

Here, the movement signal may include the x-axis value and the y-axis value of the Hall sensor together with the x-axis value and the y-axis value of the gyro sensor. Furthermore, the processor 140 may further include an internal memory (not shown) to store various data used to compensate for image shaking.

According to various examples of the present disclosure, the camera module 1000 may be implemented as an edge device including an NPU and an NPU memory.

Hereinafter, a method for compensating for image shaking using an ANN model by the processor 140 will be described in detail with reference to FIGS. 3 to 6.

Figure 3:
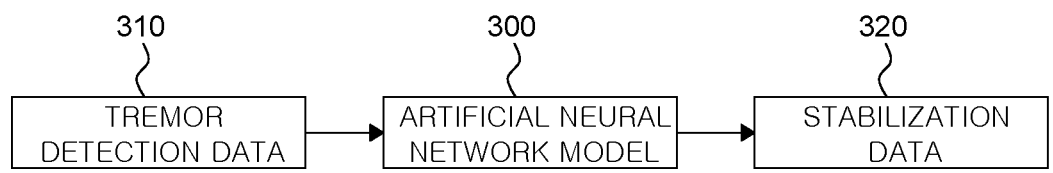
FIG. 3 is a schematic conceptual diagram illustrating an artificial neural network model according to an example of the present disclosure.

FIG. 3 illustrates an ANN model according to an example of the present disclosure.

Referring to FIG. 3, the ANN model 300 may receive an input data which is the tremor detection data 310 including a movement signal of the camera module 1000 obtained through the first sensor 120 and a movement signal of the lens 100 obtained through the second sensor 230.

To elaborate, since the image sensor 110 is fixed to the camera module 1000, when tremor of the camera module 1000 is sensed through the first sensor 120, it is possible to substantially detect the tremor of the image sensor 110. Accordingly, by detecting the tremor of the camera module 1000, the tremor of the image sensor 110 may be substantially sensed.

In detail, since the lens 100 is fixed to the lens holder 210, when the tremor of the lens holder 210 is sensed through the second sensor 230, it is possible to substantially detect the tremor of the lens 100. Accordingly, the shaking of the lens 100 may be substantially sensed by detecting the shaking of the lens holder 210.

Here, the tremor detection data may include, for example, an x-axis rotation angle and a y-axis rotation angle with respect to the camera module 1000, and an x-axis rotation angle and a y-axis rotation angle with respect to the VCM actuator 200.

In that sense, the tremor detection data of the VCM actuator 200 actually means the tremor detection data of the lens 100.

In addition, although it is shown that the lens 100 is included in the camera module 1000 in FIG. 2, this is only considering the function of the lens 100 in the camera module 1000, and it should be understood that the lens 100 is fixed to the lens holder 210.

In the example of the present disclosure, the ANN model 300 may receive the tremor detection data 310, infer stabilization data for compensating for image shaking, and output the inferred stabilization data 320.

The VCM driver 130 may receive the inferred stabilization data 320 and output a control signal for stabilizing the shaking of the lens 100. For example, the ANN model 300 may further include a conversion unit for converting the stabilization data 320 into a control signal, and the stabilization data 320 may be converted into a control signal through the conversion unit and output.

According to various examples of the present disclosure, the stabilization data 320 may be output as a control signal for controlling the VCM driver 130 to compensate the position of the image sensor 110 based on the inferred stabilization data 320. In an example of the present disclosure, the stabilization data 320 may be output as a control signal for compensating for positions of the lens 100 and the image sensor 110.

In the example of the present disclosure, the ANN model 300 may be a model to be trained by reinforcement learning.

For example, the ANN model 300 may be a model such as RNN, CNN, DNN, MDP, DP, MC, TD (SARSA), QL, DQN, PG, AC, A2C, A3C, and the like. However, the present disclosure is not limited to these and may employ various ANN models trained to infer position compensation data by inputting tremor detection data as an input.

The ANN model 300 according to various examples of the present disclosure may be a model selected from among a plurality of ANN models. The plurality of ANN models may mean an actor model, which will be described later.

Hereinafter, a method of training an ANN model will be described in detail with reference to FIG. 4, which illustrates a training method of an ANN model 400 according to an example of the present disclosure. In the presented example, it is assumed that the ANN model 400 is a model based on reinforcement learning such as Actor-Critic model. In particular, the operations to be described below may be performed by the processor 140.

Figure 4:
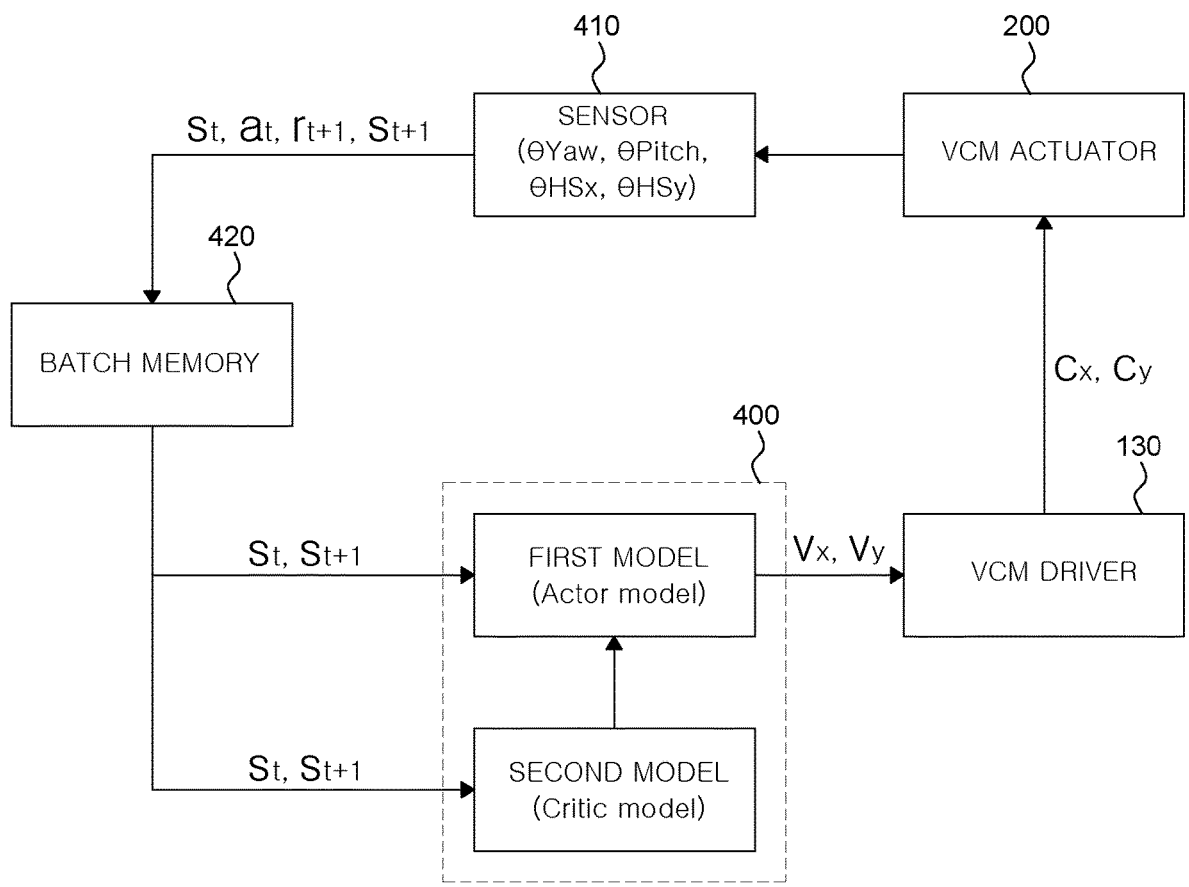
FIG. 4 is a schematic conceptual diagram illustrating a training method of an artificial neural network model according to an example of the present disclosure.

Referring to FIG. 4, the ANN model 400 may be trained to select an optimal action in a given environment or state.

Here, the ANN model 400 may be based on the Actor-Critic algorithm. The ANN model 400 may include a first model (e.g., actor model) that determines an action when a state S is given in a given environment, and a second model (e.g., critic model) that criticizes the value of the state S.

A given environment may include the current state St, the next selectable state St+1, the action a that can be taken under any condition, the reward r for an action done in a certain state, and the policy that determines the probability of taking a particular action in a given state.

Specifically, the first movement signals θYaw and θPitch for the camera module 1000 and the second movement signals θHSx and θHSy for the lens 100 are obtained through the sensor 410. Here, the first movement signals θYaw and θPitch may be obtained from the first sensor 120, and the second movement signals θHSx and θHSy may be obtained from the second sensor 230.

For example, the first movement signals θYaw and θPitch may include an x-axis rotation angle θPitch and a y-axis rotation angle θYaw with respect to the camera module 1000.

For example, the second movement signals θHSx and θHSy may include an x-axis rotation angle θHSx and a y-axis rotation angle θHSy with respect to the lens 100.

Here, the first movement signals θYaw and θPitch are signals for substantially detecting the shaking of the image sensor 110. The second movement signals θHSx and θHSy are signals for substantially sensing the shaking of the lens 100.

The processor 140 may determine environment data, including current state St, next state St+1, action at, reward rt+1, and policy by using the obtained tremor detection data (θYaw, θPitch, θHSx, θHSy), and may store it in the batch memory 420.

Here, the batch memory 420 may be a memory for storing environment data in order to train the ANN model 400 as batch data.

Data for the current state St means the currently acquired tremor detection data (θYaw, θPitch, θHSx, θHSy), and the data for the next state St+1 may refer to tremor detection data obtained after taking an action with respect to the current state. The data for the action at means the stabilization data (+Xaxis, −Xaxis, +Yaxis, −Yaxis) of the lens 100 that can be inferred based on the tremor detection data (θYaw, θPitch, θHSx, θHSy), and data for reward rt+1 means an error value. The error value may be a value based on a difference value between the x-axis rotation angle θPitch for the camera module 1000 and the x-axis rotation angle θHSx for the lens 100, and a difference value between the y-axis rotation angle θYaw for the camera module 1000 and the y-axis rotation angle θHSy for the lens 100.

Subsequently, data regarding the current state St and the next state St+1 from the batch memory 420 are input as training data to each of the first model (e.g., actor model) and the second model (e.g., critic model) of the ANN model 400.

The processor 140 trains the ANN model 400 to determine a policy (i.e., action) that maximizes the reward rt+1 based on this. Here, the policy (i.e., action) maximizing the reward rt+1 may refer to stabilization data in which an error value approaches a predetermined value. For example, the predetermined value may be zero. In the present disclosure, when the error value approaches zero, it may be determined that there is no tremor.

Specifically, the first model (e.g., actor model) infers stabilization data based on the input tremor detection data (θYaw, θPitch, θHSx, θHSy). The first model (e.g., actor model) determines the probability that the error value approaches a predetermined value when the position of the lens 100 is compensated based on the inferred stabilization data.

The second model (e.g., critic model) criticizes the value of the stabilization data inferred based on the tremor detection data (θYaw, θPitch, θHSx, θHSy) to which the first model (e.g., actor model) is input. The criticized result of the value is transmitted to a first model (e.g., actor model) so that the first model (e.g., actor model) can be used to determine a subsequent action.

In the training stage, it is possible to provide the tremor detection data in various forms.

For example, the camera module 1000 for reinforcement learning may be fixed to a specific jig and programmed to vibrate in a specific pattern.

For example, at least one user may hold the camera module 1000 for reinforcement learning and vibrate it for a specific time.

For example, for reinforcement learning, virtual tremor detection data may be provided.

Here, the specific pattern may be sitting, walking, running, a motion of a ship, a motion of a car, a motion of a motorcycle, and the like.

During the reinforcement learning period, at least one specific pattern may be applied.

During reinforcement learning, at least one specific pattern may be applied sequentially or randomly.

The stabilization data inferred through the first model (e.g., actor model) is transmitted to the VCM driver 130, and the VCM driver 130 transmits a control signal for compensating the vibration of the VCM actuator 200 to the VCM actuator 200.

In the present disclosure, the stabilization data may be converted into voltages (vx, vy) that can be input to the VCM driver 130 so that the VCM driver 130 controls the VCM actuator 200 and transmitted.

The VCM driver 130 receiving these voltages (vx, vy) transmits a control signal for controlling the VCM actuator 200 in the x-axis and the y-axis to the VCM actuator 200. Here, the control signal may include a current cx for controlling the VCM actuator 200 in the x-axis and a current cy for controlling the VCM actuator 200 in the y-axis. By compensating the position of the lens 100 by the VCM actuator 200 receiving the currents cx and cy, image shaking can be compensated.

In the next step, tremor detection data may be acquired through the sensor 410, and the above-described training operations may be repeatedly performed. These training operations may be performed until a success criterion or a maximum number of epochs is reached, but is not limited thereto. For example, the success criterion may include a criterion in which an error value determined based on inferred stabilization data approaches zero.

According to various examples of the present disclosure, the processor 140 may update the ANN model 400 by collecting the error values obtained during the training operation and further training the artificial neural network model 400 using the collected error values.

According to various examples of the present disclosure, the processor 140 may acquire modulation transfer function (MTF) data of an image and train a second model (e.g., critic model) based on the acquired MTF data.

The first model (e.g., actor model) according to various examples of the present disclosure may be customized through reinforcement learning.

Hereinafter, a detailed learning operation of the ANN model 400 will be described in detail with reference to FIG. 5, which illustrates a specific training operation of an ANN model according to an example of the present disclosure.

Figure 5:
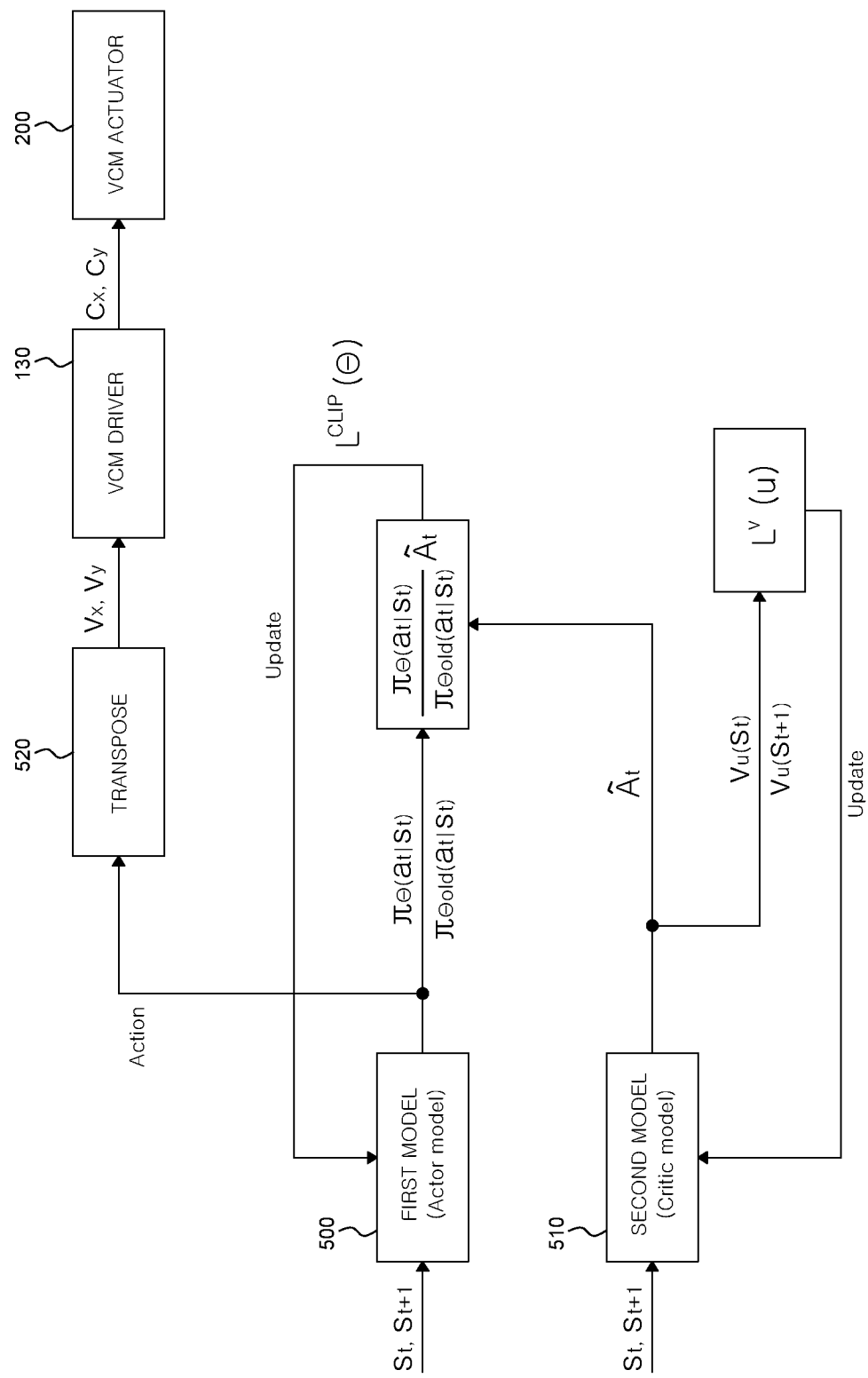
FIG. 5 is a schematic conceptual diagram illustrating a specific training operation of an artificial neural network model according to an example of the present disclosure.

Referring to FIG. 5, each of the first model 500 and the second model 510 receives the currently acquired tremor detection data (θYaw, θPitch, θHSx, θHSy) st and the tremor detection data st+1 obtained after taking an action on the current state as training data.

The first model 500 receives the tremor detection data (st, st+1) as an input and outputs an action and a policy. Here, the action means inferred stabilization data, and the policy includes a probability πθ(at|St) of taking an action at in the current state St, and a probability πθold(at|St) of taking an action at in the current state St of the first model 500 before being updated to batch.

The second model 510 receives the tremor detection data (st, st+1) as an input, and outputs the values Vv(St) and Vv(St+1) for the tremor detection data (st, st+1), and the expected profits (e.g., advantage) $\hat{A}_t$ with respect to the output values Vv(St) and Vv(St+1). Here, the value Vv(St) means the value of the tremor detection data st in the current state, and the value Vv(St+1) means the value of the tremor detection data st+1 in the next state.

The first model 500 may determine the loss $L^{CLIP}(\theta)$ based on πθ(at|St), πθold(at|St), and the output $\hat{A}_t$ of the second model 510. Here, θ may mean a parameter vector indicating all weights and biases of the first model 500. The loss $L^{CLIP}(\theta)$ can be expressed by the following Equation 1.

$$L^{CLIP}(\theta) = -\min\{f_t(\theta)\hat{A}_t, \text{clip}(f_t(\theta), 1-\varepsilon, 1+\varepsilon)\hat{A}_t\} \quad \text{Equation 1}$$

Here, $f_t(\theta)$ may mean the quotient of $\pi\theta(a_t|s_t)/\pi\theta\text{old}(a_t|s_t)$, and $\hat{A}_t$ may mean $\lambda\{(r+\gamma V_u(S_t))-V_u(S_{t+1})\}$ where r denotes a reward and γ denotes a discount factor.

The first model 500 may update the parameter vector θ of the first model 500 using the aforementioned loss $L^{CLIP}(\theta)$.

The second model 510 may determine a loss $L^v(u)$ using the values Vv(St) and Vv(St+1). Here, v may mean a parameter vector of the second model 510. The loss $L^v(u)$ may be expressed by the following Equation 2.

$$L^v(u) = V_u(s_{t+1}) - (r + \gamma V_u(s_t)) \quad \text{Equation 2}$$

The second model 510 may update the parameter vector v of the second model 510 by using the above-described loss $L^v(u)$.

The inferred stabilization data, which is the action transferred from the first model 500, is changed into voltages vx and vy that can be input from the VCM driver 130 through the conversion unit 520. For example, the stabilization data may be converted into an analog voltage or digital signal for controlling the VCM driver 130. When the voltage output from the conversion unit 520 is switched, overshooting or ringing may occur. In order to solve this problem, the conversion unit 520 may use an ANN model trained so that the voltage is sloped (e.g., damped or boosted) so as to compensate for the overshooting or ringing and output.

The VCM driver 130 transmits the control signals cx and cy so that the VCM actuator 200 compensates the position of the lens, and thereafter, a training operation may be performed as described with respect to FIG. 4.

Hereinafter, a method of compensating for image shaking using an ANN model trained as described with reference to FIGS. 4 and 5 will be described in detail with reference to FIG. 6.

In the trained ANN model, weight data is no longer updated in a state in which weight data has been trained.

In more detail, the processor 140 may be a plurality of processors such that performing training and performing inference may be respectively performed using different processors.

For example, the processor 140 performing training according to examples of the present disclosure may be a GPU, and the processor 140 performing inference may be an NPU. That is, the processor used in the machine learning process and the processor used in the inference process after the machine learning is completed may be different from each other.

For example, the processor 140 implemented as an NPU may be a dedicated processor for inference operation with a relatively fast processing speed and reduced power consumption but not supporting the machine learning algorithm.

The processor 140 implemented as an NPU is not for training, but it is implemented as a high-speed, low-power processor 140 and has the advantage that it can be implemented as a variety of edge devices. In addition, by performing additional machine learning with the processor 140 capable of machine learning and then providing the updated weight data to the processor 140 implemented as an NPU, it is possible to solve the problem of unsupported machine learning algorithm.

In more detail, the first model (e.g., actor model) according to examples of the present disclosure may be configured to be processed by the processor 140 implemented as an NPU built in the camera module 1000.

In more detail, the second model (e.g. critic model) according to examples of the present disclosure may be configured to be processed by the training-only processor 140. Here, the training-only processor 140 may be a separate processor disposed outside the camera module 1000. However, examples of the present disclosure are not limited thereto.

Figure 6:
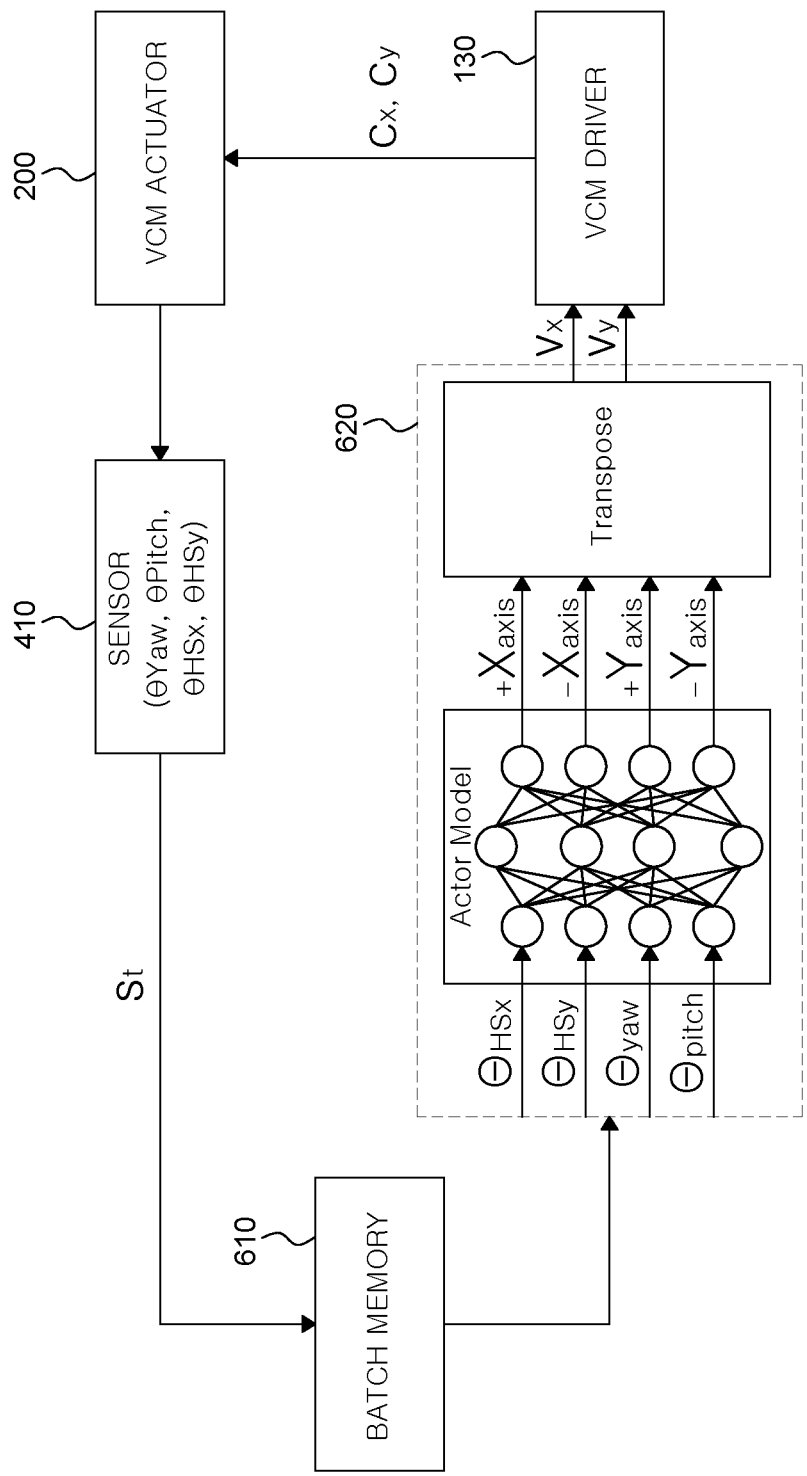
FIG. 6 is a schematic conceptual diagram illustrating a method of compensating for image shaking using a trained artificial neural network model according to an example of the present disclosure.

FIG. 6 illustrates a method of compensating for image shaking using a trained ANN model according to an example of the present disclosure. Operations to be described below may be performed through the processor 140 implemented as an NPU. However, the processor 140 according to the examples of the present disclosure is not limited to the NPU.

In the example of FIG. 6, the second model (e.g., critical model) may be excluded. Accordingly, inference can be performed using only the first model (e.g., actor model). In this case, training of the weight of the first model (e.g., actor model) may be completed. In addition, when only the first model (e.g., actor model) is used, the training step may be excluded and the second model (e.g., critic model) may be excluded, so that power consumption, calculation amount, and processing speed may be improved. In addition, a high-speed and low-power camera module 1000 may be implemented by applying the low-power processor 140 implemented as an NPU.

Referring to FIG. 6, the tremor detection data St corresponding to the environment is obtained through the sensor 600, and the obtained tremor detection data St is stored in the batch memory 610.

The tremor detection data St stored in the batch memory 610 is input as input data of the stabilization signal generator 620. The stabilization signal generator 620 may include, for example, a first model (e.g., actor model) including four input nodes, a plurality of hidden layers, and four output nodes. However, the structure of the first model (e.g., actor model) is not limited thereto.

When (θYaw, θPitch, θHSx, θHSy) are input from each of the four input nodes, the first model (e.g., actor model) infers stabilization data (+Xaxis, −Xaxis, +Yaxis, −Yaxis) for convergence of the error value r to a predetermined value. Accordingly, the first model (e.g., actor model) may output the inferred stabilization data (+Xaxis, −Xaxis, +Yaxis, −Yaxis).

Here, the error value r may be a summed value of a difference value (errx) between the x-axis rotation angle θPitch for the camera module 1000 and the x-axis rotation angle θHSx for the lens 100, and a difference value (erry) between the y-axis rotation angle θYaw for the camera module 1000 and the y-axis rotation angle θHSy for the lens 100. For example, the error value may be expressed as—(| errx+erry |).

The conversion unit 520 may change the stabilization data (+Xaxis, −Xaxis, +Yaxis, −Yaxis) inferred from the first model (e.g., actor model) into a voltage available for input of the VCM driver 130. The conversion unit 520 converts the stabilization data into voltages vx and vy using a conversion formula or a lookup table, and outputs the converted voltages vx and vy as control signals. For example, these voltages (vx, vy) are in a range between 0 V to 5 V, and a corresponding range may correspond to the input standard of the VCM driver 130.

For example, when +Xaxis is input, the voltage of the stabilization voltage vx may be increased by one step, for example, 0.001 V. For example, when −Xaxis is input, the voltage of the stabilization voltage vx may be decreased by one step, for example, 0.001 V.

For example, when +Yaxis is input, the voltage of the stabilization voltage vy may be increased by one step, for example, by 0.001 V. For example, when −Yaxis is input, the voltage of the stabilization voltage vy may be decreased by one step, for example, by 0.001 V. That is, the stabilization voltage may be varied in units of preset voltage steps. The stabilization speed may be determined according to the unit of the voltage step and the interval at which the voltage step is updated.

However, examples of the present disclosure are not limited to the voltage step and the time interval.

When voltages vx and vy are input, the VCM driver 130 may output a control signal for compensating for tremor of the VCM actuator 200 according to stabilization data. This control signal may be currents (cx, cy) for controlling the VCM actuator 200. For example, the currents (cx, cy) may be −100 mA to +100 mA, and the corresponding range may correspond to the input standard of the VCM actuator 200.

When the currents (cx, cy) are input, the VCM actuator 200 operates to compensate the position of the lens 100 according to the input current, thereby performing image stabilization.

Hereinafter, a method in which the apparatus A further includes a sensor for measuring temperature and compensates for image shaking by further considering temperature data will be described in detail with reference to FIGS. 7 to 9.

Figure 7:
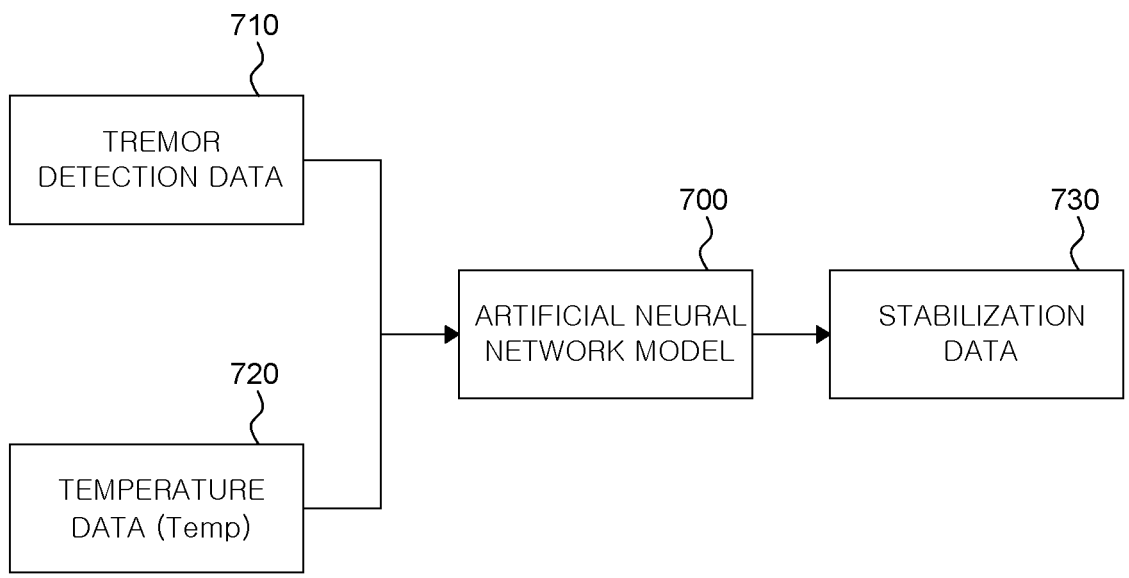
FIG. 7 is a schematic conceptual diagram illustrating an artificial neural network model according to another example of the present disclosure.

FIG. 7 illustrates an ANN model according to another example of the present disclosure.

Referring to FIG. 7, an ANN model 700 includes the movement signal of the camera module 1000 obtained through the first sensor 120 and the movement signal of the lens 100 obtained through the second sensor 230. The included tremor detection data 710 and the temperature data 720 obtained through the temperature sensor are input as input data.

In more detail, since the image sensor 110 is fixed to the camera module 1000, when vibration of the camera module 1000 is sensed through the first sensor 120, it is possible to substantially detect the vibration of the image sensor 110. Accordingly, the tremor of the image sensor 110 may be substantially sensed by detecting the tremor of the camera module 1000.

In more detail, since the lens 100 is fixed to the lens holder 210, when the vibration of the lens holder 210 is sensed through the second sensor 230, the vibration of the lens 100 can be substantially sensed. Accordingly, the tremor of the lens 100 may be substantially sensed by detecting the tremor of the lens holder 210.

Here, the tremor detection data may refer to the tremor detection data described above with reference to FIG. 3. The temperature sensor for measuring the temperature data may be a sensor included in the camera module 1000, a sensor included in the processor 140, or a dedicated sensor, but is not limited thereto.

In the example of the present disclosure, the ANN model 700 may infer stabilization data for compensating for image shaking by inputting the tremor detection data 710 and the temperature data 720 as inputs, and the ANN model may output the inferred stabilization data 730.

Hereinafter, the training method of the ANN model 700 of FIG. 7 will be described in detail with reference to FIG. 8.

Figure 8:
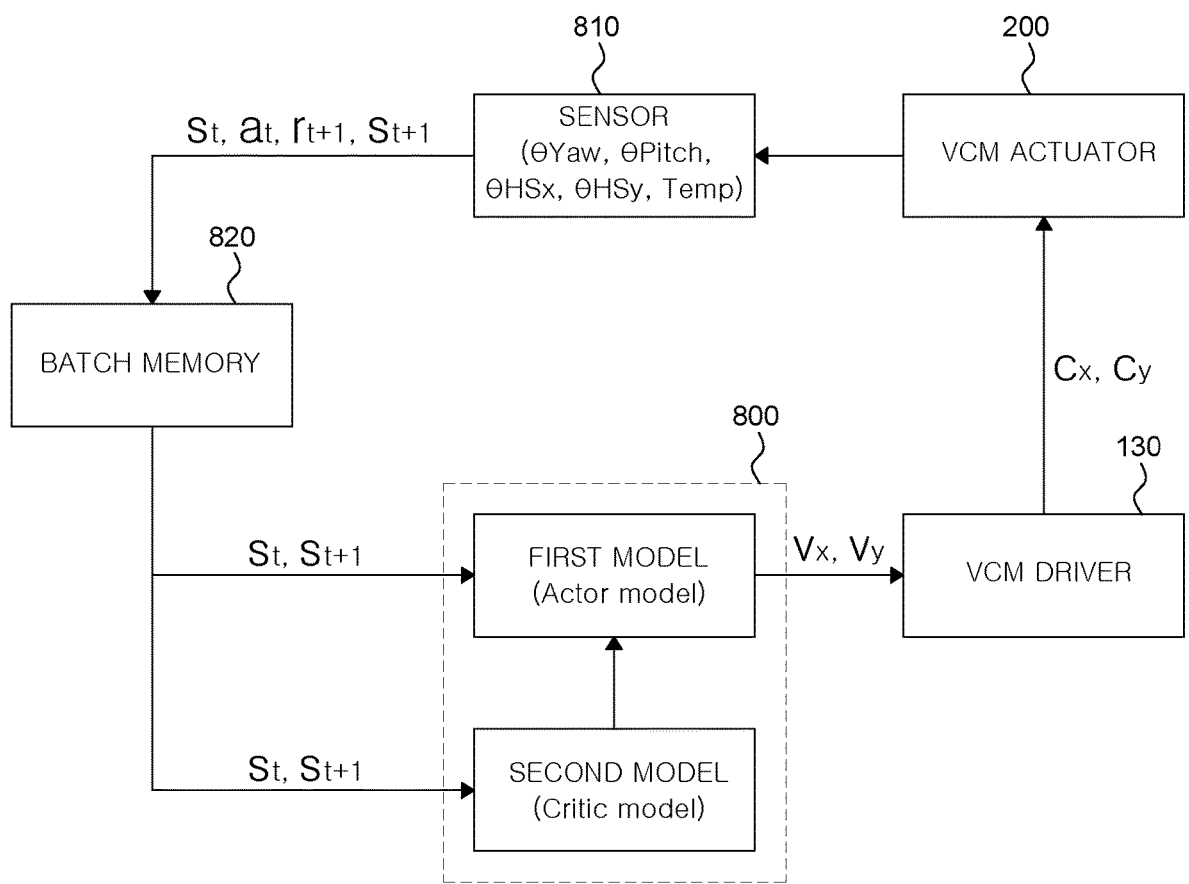
FIG. 8 is a schematic conceptual diagram illustrating a training method of an artificial neural network model according to another example of the present disclosure.

FIG. 8 illustrates a training method of an ANN model according to another example of the present disclosure. In the presented example, it is assumed that the ANN model 700 is a model based on reinforcement learning such as Actor-Critic. In particular, the operations to be described below may be performed by the processor 140.

Referring to FIG. 8, the first movement signals θYaw and θPitch for the camera module 1000, the second movement signals θHSx and θHSy for the lens 100, and the temperature data Temp are obtained through the sensor 710.

Here, the first movement signals θYaw and θPitch are obtained from the first sensor 120, the second movement signals θHSx and θHSy are obtained from the second sensor 230, and a temperature signal Temp is obtained from the temperature sensor.

Here, the first movement signals θYaw and θPitch are signals for substantially detecting the shaking of the image sensor 110. The second movement signals θHSx and θHSy are signals for substantially sensing the shaking of the lens 100.

The processor 140 may determine and store environmental data including a current state St, a next state St+1, an action at, a reward rt+1, and a policy in the batch memory 820 by using the obtained tremor detection data (θYaw, θPitch, θHSx, θHSy) and temperature data Temp.

Here, the data on the current state St may mean the currently acquired tremor detection data (θYaw, θPitch, θHSx, θHSy) and the temperature data Temp. The data for the next state St+1 may refer to vibration detection data and temperature data obtained after taking an action with respect to the current state.

The data with respect to action at means stabilization data (+Xaxis, −Xaxis, +Yaxis, −Yaxis) of the lens 100 that can be inferred based on the tremor detection data (θYaw, θPitch, θHSx, θHSy) and the temperature data Temp.

Data for reward rt+1 means an error value based on the temperature data Temp and a difference value. The difference value is a difference between two values. Here, a first value is a difference between the x-axis rotation angle θPitch with respect to the camera module 1000 and the x-axis rotation angle θHSx with respect to the lens 100, and a second value is a difference between the y-axis rotation angle θYaw with respect to the camera module 1000 and the y-axis rotation angle θHSy with respect to the lens 100.

Subsequently, data regarding the current state St and the next state St+1 from the batch memory 820 are input to each of the first model (e.g., actor model) and the second model (e.g., critic model) of the ANN model 400 as training data.

The processor 140 trains the artificial neural network model to determine a policy (i.e., action) that maximizes the reward rt+1 based on this. Specifically, the first model (e.g., actor model) infers stabilization data based on the input tremor detection data (θYaw, θPitch, θHSx, θHSy) and the temperature data Temp. The first model (e.g., actor model) determines the probability that the error value approaches a predetermined value when the position of the lens 100 is compensated based on the inferred stabilization data.

The second model (e.g., critic model) criticizes the value of the stabilization data inferred based on the vibration detection data (θYaw, θPitch, θHSx, θHSy) and the temperature data Temp to which the first model (e.g., actor model) is input.

The criticized result of the value from the second model is transmitted to a first model (e.g., actor model) so that the first model (e.g., actor model) can be used to determine a subsequent action.

In the training stage, it is possible to provide the tremor detection data in various forms.

For example, the camera module 1000 for reinforcement learning may be fixed to a specific jig and programmed to move in a specific pattern.

For example, at least one user may hold the camera module 1000 for reinforcement learning and move it for a specific time.

For example, for reinforcement learning, virtual tremor detection data may be provided.

Here, the specific pattern may be sitting, walking, running, a motion of a ship, a motion of a car, a motion of a motorcycle, and the like.

During the reinforcement learning period, at least one specific pattern may be applied.

During reinforcement learning, at least one specific pattern may be applied sequentially or randomly.

The stabilization data inferred through the first model (e.g., actor model) is transmitted to the VCM driver 130, and the VCM driver 130 transmits a control signal for compensating the vibration of the VCM actuator 200 to the VCM actuator 200. The VCM driver 130 receiving the voltages vx and vy transmits a control signal for controlling the VCM actuator 200 in the x-axis and the y-axis to the VCM actuator 200. By compensating the position of the lens 100 by the VCM actuator 200 receiving the control signal, image shaking can be compensated.

In the next step, tremor detection data and temperature data may be acquired through the sensor 810, and the above-described training operations may be repeatedly performed. These training operations may be performed until a success criterion or a maximum number of epochs is reached, but is not limited thereto. For example, the success criterion may include a criterion in which an error value determined based on inferred stabilization data approaches zero.

Hereinafter, a detailed training operation of the ANN model 800 will be described in detail with reference to FIG. 5. The ANN model 800 may perform training in the same way as described with reference to FIG. 5.

Referring to FIG. 5, each of the first model 500 and the second model 510 receives a current state St including the currently acquired tremor detection data (θYaw, θPitch, θHSx, θHSy) and temperature data Temp, and a next state st+1 including the tremor detection data and temperature data obtained after taking an action on the current state as training data.

The first model 500 outputs stabilization data inferred by inputting tremor detection data and temperature data (st, st+1) along with the probability of taking action πθ(at|St) in the current state St and the probability of taking action πθold(at|St) in the current state St of the first model 500 before being updated to batch.

The second model 510 receives the tremor detection data and temperature data (st, st+1) as an input, and outputs the values Vv(St) and Vv(St+1) for the tremor detection data (st, st+1), and the expected profits (e.g., advantage) $\hat{A}_t$.

The first model 500 may determine the loss $L^{CLIP}(θ)$ based on πθ(at|St), πθold(at|St) and the output $\hat{A}_t$ of the second model 510, and by using the determined loss $L^{CLIP}(θ)$, the parameter vector θ of the first model 500 can be updated. The loss $L^{CLIP}(θ)$ can be updated by using above Equation 1.

The second model 510 may determine a loss $L^v(u)$ using the values Vv(St) and Vv(St+1) and by using the determined loss $L^v(u)$, the parameter vector v of the second model 510 may be updated. The loss can be calculated using the above Equation 2.

The stabilization data transmitted from the first model 500 is converted into voltages (vx, vy) that can be input by the VCM driver 130 through the conversion unit 520 and output, the VCM driver 130 transmits the control signals (cx, cy) so that the VCM actuator 200 compensates for the position of the lens, and thereafter, a training operation may be performed as described in FIG. 8.

Hereinafter, a method of compensating for image shaking using the ANN model trained as described with reference to FIGS. 5 and 8 will be described in detail with reference to FIG. 9.

Figure 9:
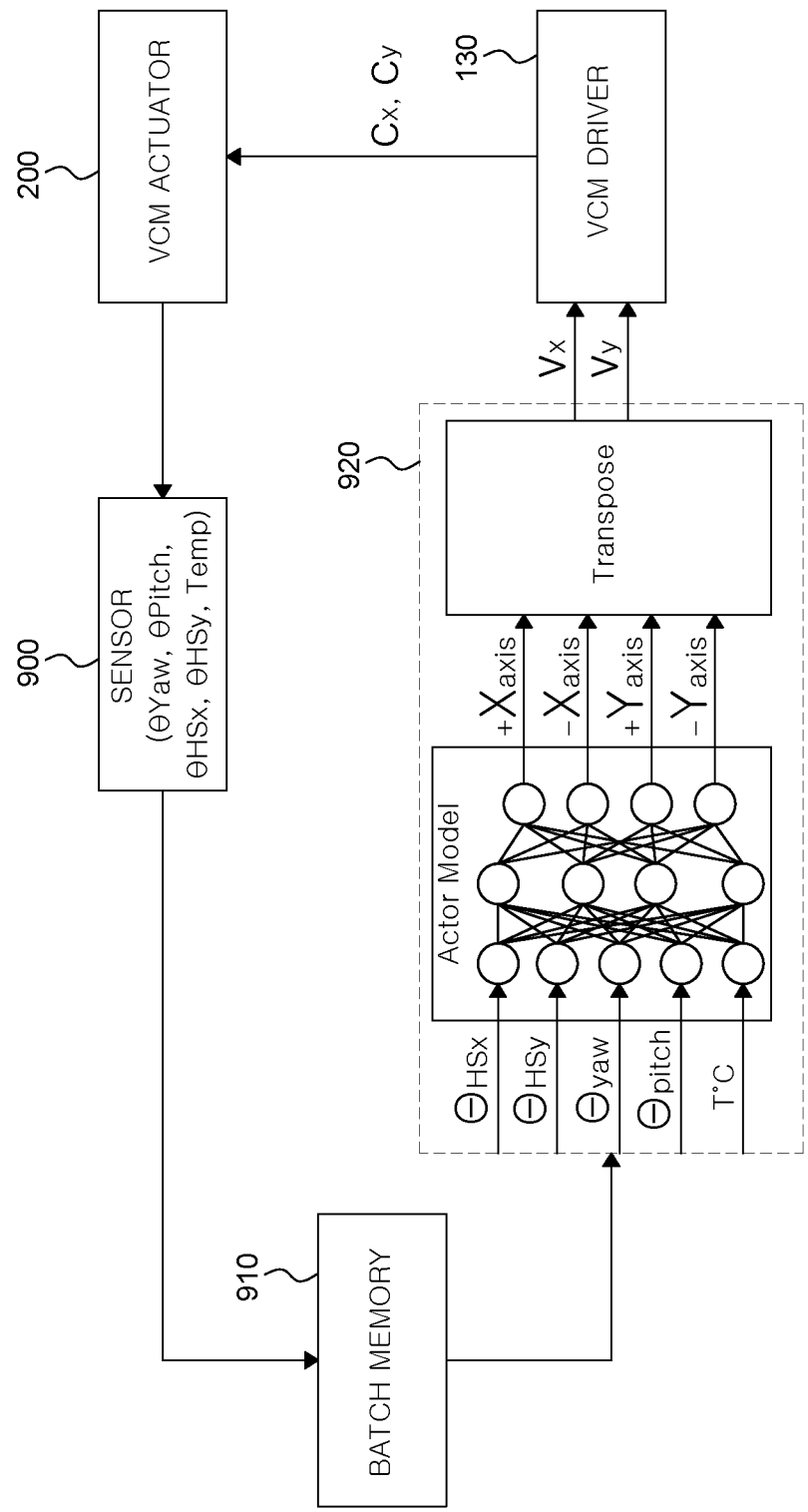
FIG. 9 is a schematic conceptual diagram illustrating a method of compensating for image shaking using a trained artificial neural network model according to another example of the present disclosure.

FIG. 9 illustrates a method of compensating for image shaking using a trained ANN model according to another example of the present disclosure. Operations to be described later may be performed through the processor 140.

In the example of FIG. 9, the second model (e.g., critical model) may be excluded. Accordingly, inference can be performed using only the first model (e.g., actor model). In this case, training of the weight of the first model (e.g., actor model) may be completed.

In addition, when only the first model (e.g., actor model) is used, the training step may be excluded and the second model (e.g., critic model) may be excluded, so that power consumption, calculation amount, and processing speed may be improved. In addition, a high-speed, low-power camera module 1000 may be implemented by applying the low-power processor 140 implemented as an NPU.

Referring to FIG. 9, tremor detection data and temperature data St corresponding to the environment are obtained through the sensor 900, and the obtained tremor detection data and temperature data St are stored in the batch memory 910.

The tremor detection data and temperature data St stored in the batch memory 910 are input as input data of the stabilization signal generator 920. The stabilization signal generator 920 may include a first model (e.g., actor model) including five input nodes, a plurality of hidden layers, and four output nodes. However, the structure of the first model (e.g., actor model) is not limited thereto.

When θYaw, θPitch, θHSx, θHSy, and Temp is inputted from each of the five input nodes, the first model (e.g., actor model) infers stabilization data (+Xaxis, −Xaxis, +Yaxis, −Yaxis) for convergence of the error value r to a predetermined value, and outputs the inferred stabilization data (+Xaxis, −Xaxis, +Yaxis, −Yaxis). Here, the error value r is a summed value of a difference value errx between the x-axis rotation angle θPitch for the camera module 1000 and the x-axis rotation angle θHSx for the lens 100, and a difference value erry between the y-axis rotation angle θYaw for the camera module 1000 and the y-axis rotation angle θHSy for the lens 100. For example, the error value may be expressed as−(| errx+erry |).

The stabilization signal generator 920 may further include a conversion unit Transpose configured to change the inferred stabilization data (+Xaxis, −Xaxis, +Yaxis, −Yaxis) to a voltage available for input of the VCM driver 130. The conversion unit Transpose converts the stabilization data into voltages (vx, vy) using a conversion formula or a lookup table, and outputs the converted voltages (vx, vy) as control signals.

When voltages (vx, vy) are input, the VCM driver 130 may output a control signal for compensating for tremor of the VCM actuator 200 according to stabilization data. These control signals may be currents (cx, cy) for controlling the VCM actuator 200.

When the currents (cx, cy) are input, the VCM actuator 200 operates to compensate the position of the lens 100 according to the input current, thereby performing image stabilization.

Hereinafter, the apparatus A may further include a coil for auto focus (AF), and a method of controlling AF and OIS based on an ANN will be described in detail with reference to FIGS. 10 to 14.

Figure 10:
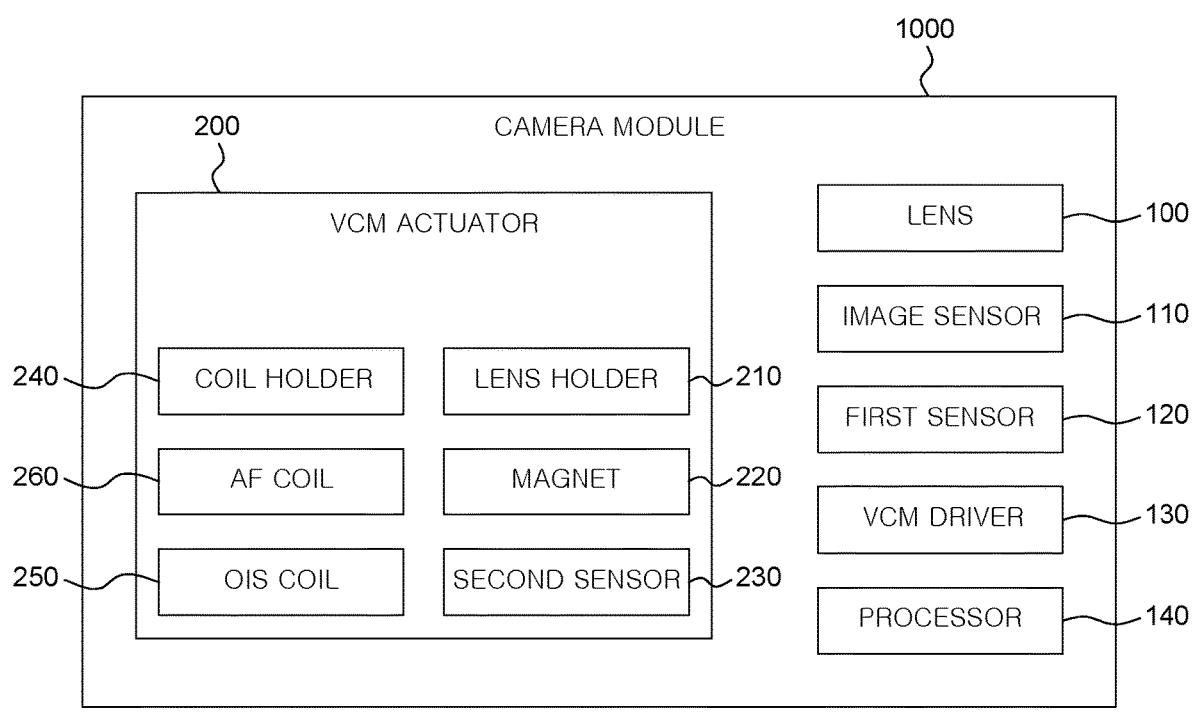
FIG. 10 is a schematic conceptual diagram illustrating a camera module according to another example of the present disclosure.

FIG. 10 illustrates a camera module according to another example of the present disclosure. In the presented example, descriptions of redundant elements may be omitted for convenience of description.

Referring to FIG. 10, the camera module 1000 may include a lens 100, an image sensor 110, a first sensor 120, a VCM driver 130, a processor 140 and a VCM actuator 200. The VCM actuator 200 may further include an AF coil 260.

The AF coil 260 may be disposed to correspond to an AF magnet (not shown), and a voltage for controlling the position of the AF magnet may be applied.

The processor 140 may obtain a movement signal from two or more sensors (i.e., at least the first sensor 120 and the second sensor 230) included in the camera module 1000, may determine the amount of defocus from the frequency component of the image, and may infer the tremor compensation signal using the ANN model trained to infer the tremor compensation signal for compensating for image tremor and focus. Subsequently, the processor 140 may compensate for image shaking and focus based on the inferred tremor compensation signal. Here, the movement signal may further include a z-axis value of the Hall sensor for focus adjustment.

Hereinafter, a method for compensating for image shaking by using an ANN model in the processor 140 and adjusting focus will be described in detail with reference to FIGS. 11 to 14.

Figure 11:
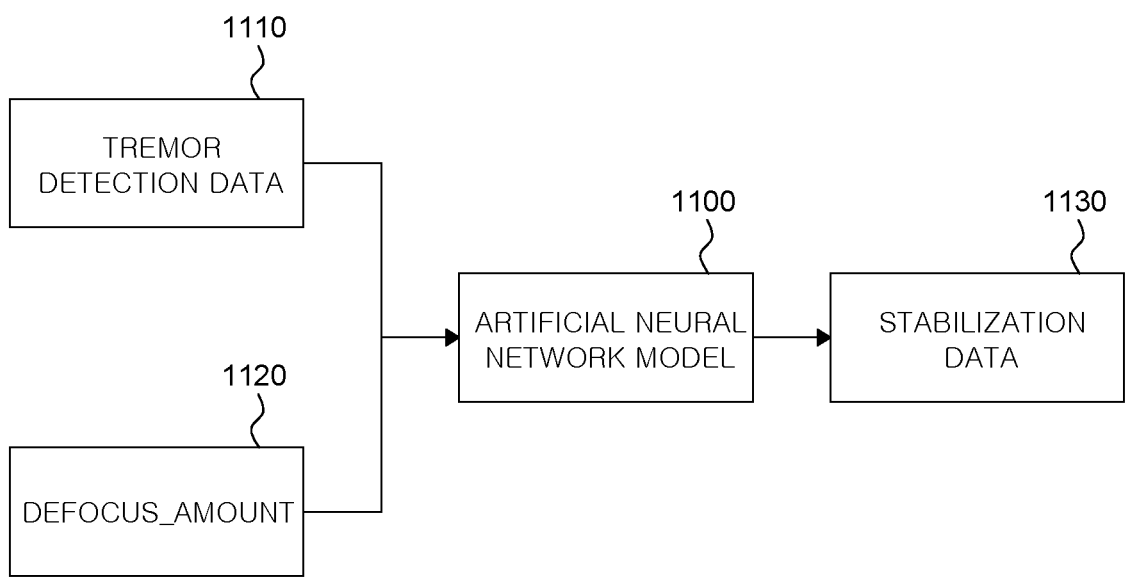
FIG. 11 is a schematic conceptual diagram illustrating an artificial neural network model according to another example of the present disclosure.

FIG. 11 illustrates an ANN model according to another example of the present disclosure.

Referring to FIG. 11, in an ANN model 1100, a tremor detection data 1110 including a movement signal of the camera module 1000 obtained through the first sensor 120 and a movement signal of the lens 100 obtained through the second sensor 230 and a defocus_amount data 1120 determined from the frequency component of the image are input as input data. Here, the tremor detection data may further include a z-axis rotation angle obtained through the Hall sensor.

In the example of the present disclosure, the artificial neural network model 1100 may compensate for image shaking by receiving tremor detection data 1110 and defocus amount data 1120 as inputs, infer stabilization data for adjusting a focus, and may output the inferred stabilization data 1130.

Hereinafter, a training method of the ANN model 1100 of FIG. 11 will be described in detail with reference to FIG. 12.

Figure 12:
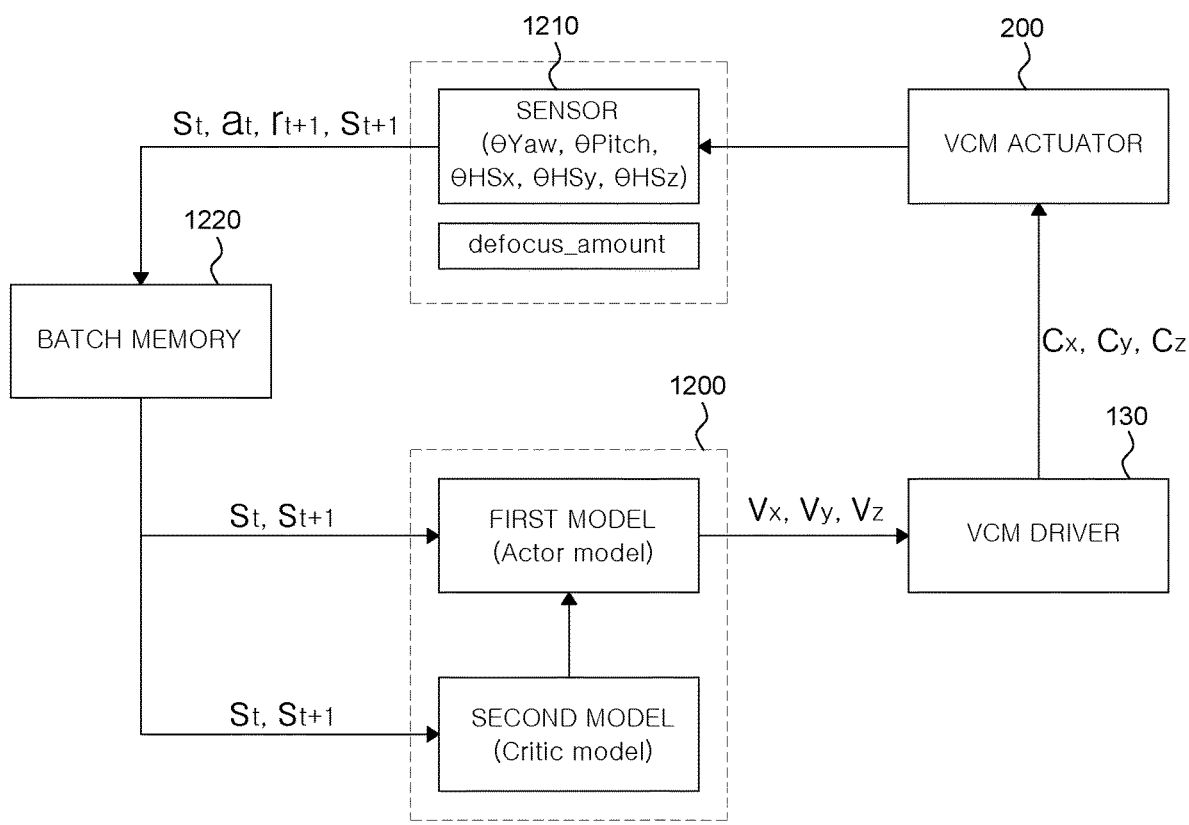
FIG. 12 is a schematic conceptual diagram illustrating a training method of an artificial neural network model according to another example of the present disclosure.

FIG. 12 illustrates a training method of an ANN model according to another example of the present disclosure. In the presented example, it is assumed that the ANN model 1200 is a model based on reinforcement learning such as Actor-Critic. In particular, operations to be described below may be performed through the processor 140.

Referring to FIG. 12, a first movement signal (θYaw, θPitch) for the camera module 1000 and a second movement signal (θHSx, θHSy, θHSz) for the lens 100 are obtained through the sensor 1210, and defocus amount data determined from the frequency component of the image is obtained. The defocus amount data may be acquired by the processor 140, an image sensor, or an image signal processor (ISP).

The processor 140 may determine environmental data including a current state St, a next state St+1, an action at, a reward rt+1, and a policy, by using the obtained tremor detection data (θYaw, θPitch, θHSx, θHSy), the lens focus data θHSz, and the defocus amount data defocus_amount, and then the determined environment data may be stored in the batch memory 1220. Here, the data on the current state St may mean currently acquired tremor detection data (θYaw, θPitch, θHSx, θHSy), lens focus data θHSz, and defocus amount data defocus_amount. Data for the next state St+1 may mean tremor detection data and defocus amount data obtained after taking an action on the current state. The data for the action at may mean stabilization data (+Xaxis, −Xaxis, +Yaxis, −Yaxis, +Zaxis, −Zaxis,) of the lens 100 that can be inferred based on the tremor detection data (θYaw, θPitch, θHSx, θHSy), the lens focus data θHSz, and the defocus amount data defocus_amount. The data for the reward rt+1 may mean an error value based on defocus amount data and a difference value, where the difference value is a difference between two values. Here, a first value is a difference between the x-axis rotation angle θPitch for the camera module 1000 and the x-axis rotation angle θHSx for the lens 100, and a second value is a difference between the y-axis rotation angle θYaw for the camera module 1000 and the y-axis rotation angle θHSy for the lens 100.

Subsequently, data for the current state St and the next state St+1 from the batch memory 1220 are input to each of the first model (e.g., actor model) and the second model (e.g., critic model) of the ANN model 1200 as training data.

The processor 140 trains the ANN model 1200 based on this to infer the stabilization data in which the error value approaches a predetermined value.

Specifically, the first model (e.g., actor model) infers stabilization data based on the input shake detection data (θYaw, θPitch, θHSx, θHSy), the lens focus data θHSz, and the defocus amount data defocus_amount. The first model (e.g., actor model) determines the probability that the error value approaches a predetermined value when the position of the lens 100 is compensated based on the inferred stabilization data.

The second model (e.g., critic model) criticizes the value of the stabilization data inferred based on the tremor detection data (θYaw, θPitch, θHSx, θHSy), the lens focus data (θHSz), and the defocus amount data (defocus_amount) inputted by the first model (e.g., actor model). The criticized result of the value is transmitted to a first model (e.g., actor model) so that the first model (e.g., actor model) can be used to determine a subsequent action.

In the training stage, it is possible to provide the tremor detection data in various forms.

For example, the camera module 1000 for reinforcement learning may be fixed to a specific jig and programmed to vibrate in a specific pattern.

For example, at least one user may hold the camera module 1000 for reinforcement learning and vibrate it for a specific time.

For example, for reinforcement learning, virtual tremor detection data may be provided.

Here, the specific pattern may be sitting, walking, running, a motion of a ship, a motion of a car, a motion of a motorcycle, and the like.

During the reinforcement learning period, at least one specific pattern may be applied.

During reinforcement learning, at least one specific pattern may be applied sequentially or randomly.

The stabilization data inferred through the first model (e.g., actor model) is transmitted to the VCM driver 130, and the VCM driver 130 transmits a control signal for compensating the vibration of the VCM actuator 200 to the VCM actuator 200. In the present disclosure, the stabilization data may be converted into voltages (vx, vy, vz) that can be input to the VCM driver 130 so that the VCM driver 130 controls the VCM actuator 200 and transmitted. The VCM driver 130 receiving these voltages (vx, vy, vz) transmits a control signal for controlling the VCM actuator 200 in the x-axis, y-axis, and z-axis to the VCM actuator 200. Here, the control signal may include a current cx for controlling the VCM actuator 200 in the x-axis, a current cy for controlling the VCM actuator 200 in the y-axis, and a current cz for controlling the VCM actuator 200 in the z-axis.

The VCM actuator 200 receiving these currents cx, cy, and cz operates so that the position of the lens 100 is compensated, thereby compensating for image shaking.

In the next step, after the tremor detection data (θYaw, θPitch, θHSx, θHSy) and lens focus data θHSz are acquired through the sensor 1210, and the defocus amount data defocus_amount is obtained from the frequency component of the image, the above-described training operations may be repeatedly performed. These training operations may be performed until a success criterion or a maximum number of epochs is reached, but is not limited thereto. For example, the success criterion may include a criterion in which an error value determined based on inferred stabilization data approaches zero.

Hereinafter, a specific training operation of the ANN model 1200 will be described in detail with reference to FIG. 13, which illustrates a specific training operation of an ANN model according to another example of the present disclosure.

Figure 13:
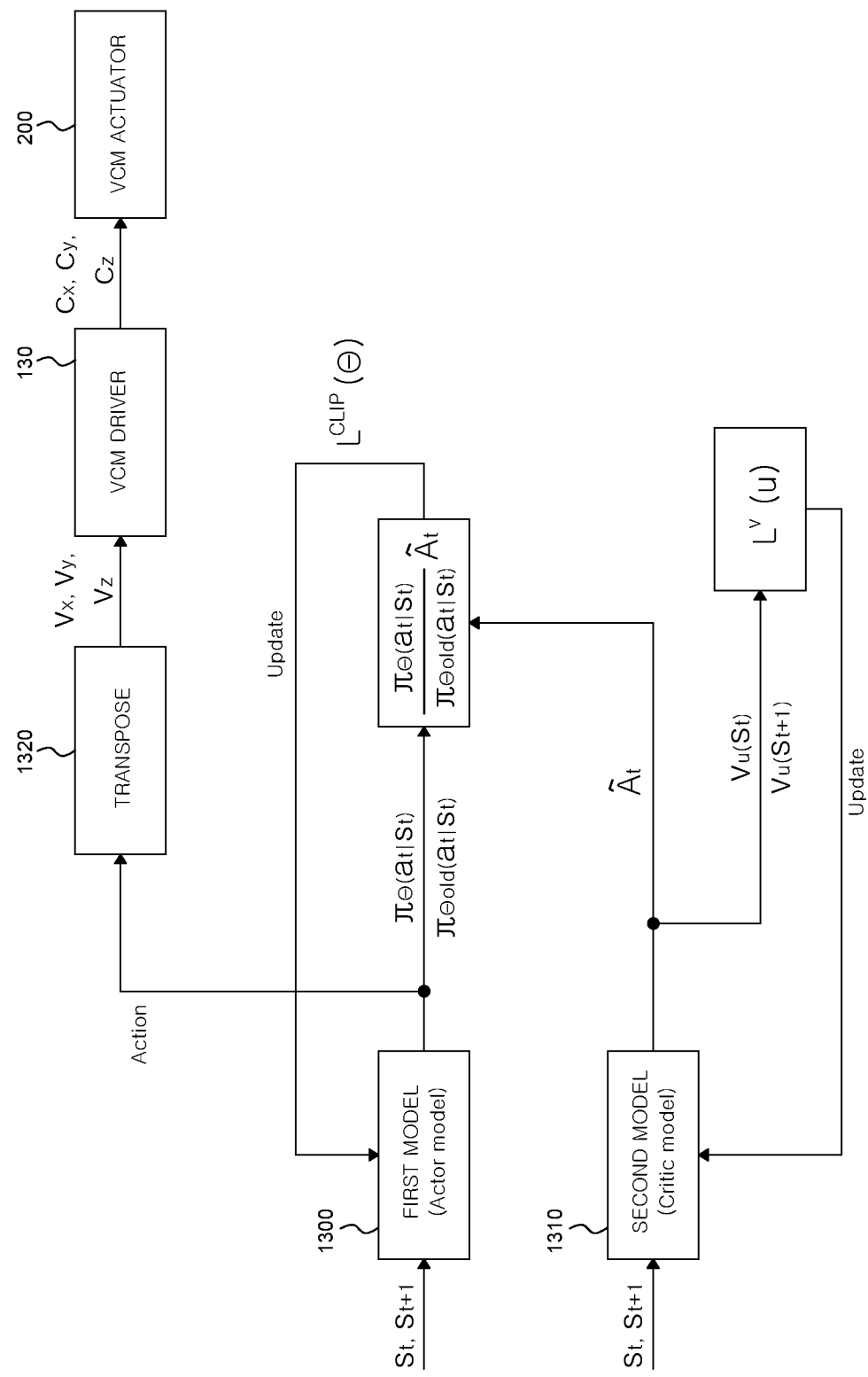
FIG. 13 is a schematic conceptual diagram illustrating a specific training operation of an artificial neural network model according to another example of the present disclosure.

Referring to FIG. 13, each of the first model 1300 and the second model 1310 receives the current state st including currently acquired tremor detection data (θYaw, θPitch, θHSx, θHSy), lens focus data θHSz, and defocus amount data defocus_amount, and the next state st+1 including tremor detection data and defocus amount data obtained after taking an action on the current state as training data.

The first model 1300 outputs stabilization data inferred by inputting tremor detection data and defocus amount data (st, st+1) along with the probability of taking action πθ(at|St) in the current state St and the probability of taking action πθold(at|St) in the current state St of the first model 1300 before being updated to batch.

The second model 1310 receives the tremor detection data and defocus amount data (st, st+1) as an input, and outputs the values Vv(St) and Vv(St+1) for the tremor detection data (st, st+1), and the expected profits (e.g., advantage) $\hat{A}_t$.

The first model 1300 may determine the loss $L^{CLIP}(\theta)$ based on πθ(at|St), πθold(at|St), and the output $\hat{A}_t$ of the second model 1310, and by using the determined loss $L^{CLIP}(\theta)$, the parameter vector θ of the first model 500 can be updated. The loss $L^{CLIP}(\theta)$ can be updated by using the above Equation 1.

The second model 1310 may determine a loss L$^v$(u) using the values Vv(St) and Vv(St+1) and by using the determined loss L$^v$(u), the parameter vector v of the second model 1310 may be updated. The loss can be calculated using the above Equation 2.

The stabilization data transmitted from the first model 1300 is converted into voltages (vx, vy, vz) that can be input by the VCM driver 130 through the conversion unit 1320 and output, the VCM driver 130 transmits the control signals (cx, cy, cz) so that the VCM actuator 200 compensates for the position of the lens, and thereafter, a training operation may be performed as described in FIG. 12.

Hereinafter, a method of compensating for image shaking using the ANN model trained as described with reference to FIGS. 12 and 13 will be described in detail with reference to FIG. 14.

Figure 14:
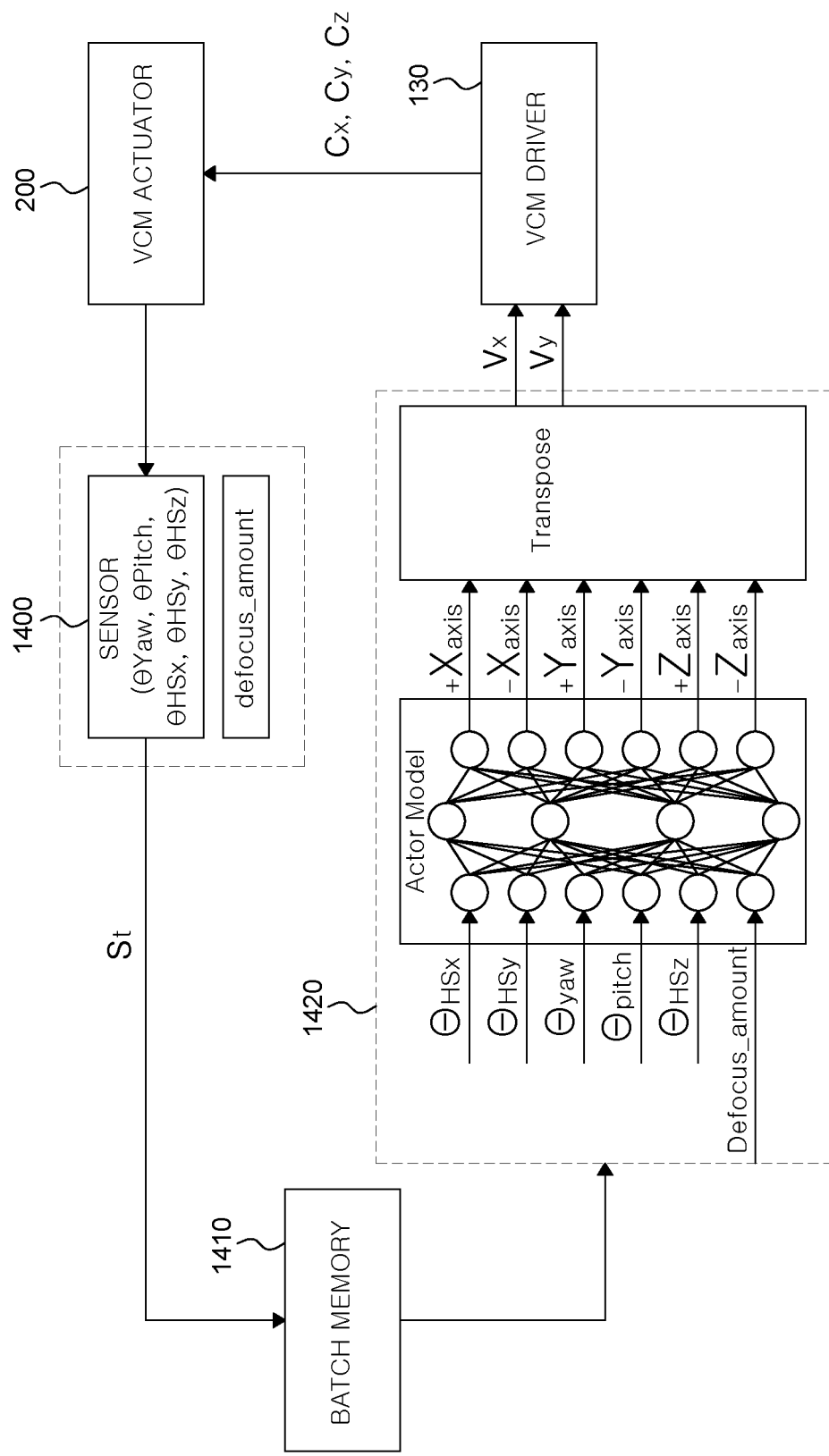
FIG. 14 is a schematic conceptual diagram illustrating a method of compensating for image shaking using a trained artificial neural network model according to another example of the present disclosure.

FIG. 14 illustrates a method of compensating for image shaking using a trained ANN model according to another example of the present disclosure. Operations to be described later may be performed through the processor 140.

Referring to FIG. 14, tremor detection data is obtained through the sensor 1400, and after defocus amount data St is obtained from the frequency component of the image, the obtained tremor detection data and defocus amount data St are stored in the batch memory 1410.

In the example of FIG. 14, the second model (e.g., critical model) may be excluded. Accordingly, inference can be performed using only the first model (e.g., actor model). In this case, training of the weight of the first model (e.g., actor model) may be completed. In addition, when only the first model (e.g., actor model) is used, the training step may be excluded and the second model (e.g., critic model) may be excluded, so that power consumption may be reduced, calculation amount may be reduced, and processing speed may be increased. In addition, a high-speed, low-power camera module 1000 may be implemented by applying the low-power processor 140 implemented as an NPU.

The tremor detection data and defocus amount data St stored in the batch memory 1410 are input as input data of the stabilization signal generator 1420. The stabilization signal generator 1420 may include a first model (e.g., actor model) including six input nodes, a plurality of hidden layers, and six output nodes. However, the structure of the first model (e.g., actor model) is not limited thereto.

When θYaw, θPitch, θHSx, θHSy, θHSz, and defocus_amount is inputted from each of the six input nodes, the first model (e.g., actor model) infers stabilization data (+Xaxis, −Xaxis, +Yaxis, −Yaxis, +Zaxis, −Zaxis) for convergence of the error value r to a predetermined value, and outputs the inferred stabilization data (+Xaxis, −Xaxis, +Yaxis, −Yaxis, +Zaxis, −Zaxis). Here, the error value r may be a value obtained by adding a defocus amount (defocus_amount) to a summed value of a difference value errx between the x-axis rotation angle θPitch for the camera module 1000 and the x-axis rotation angle θHSx for the lens 100, and a difference value erry between the y-axis rotation angle θYaw for the camera module 1000 and the y-axis rotation angle θHSy for the lens 100. For example, the error value may be expressed as−(| errx+erry |).

Defocus_amount may be adjusted according to a voltage vz value. The AF coil 260 may adjust the z-axis of the AF coil 260 according to the cz value corresponding to the voltage vz. Accordingly, the z-axis of the lens 100 fixed to the lens holder 210 provided with the AF coil 260 may be moved. Therefore, Defocus_amount can be adjusted.

The stabilization signal generator 1420 may further include a conversion unit Transpose configured to change the inferred stabilization data (+Xaxis, −Xaxis, +Yaxis, −Yaxis, +Zaxis, −Zaxis) into a voltage usable for input of the VCM driver 130. The conversion unit Transpose converts the stabilization data into voltages (vx, vy, vz) using a conversion formula or a lookup table, and outputs the converted voltages (vx, vy, vz) as a control signal.

When the voltages (vx, vy, vz) are input, the VCM driver 130 may output a control signal for compensating for vibration of the VCM actuator 200 according to the stabilization data. These control signals may be currents (cx, cy, cz) for controlling the VCM actuator 200.

When the current (cx, cy, cz) is input, the VCM actuator 200 operates to compensate the position of the lens 100 according to the input current, thereby stabilizing the image and adjusting the focus.

The camera module 1000 according to various examples of the present disclosure may obtain tremor detection data (θYaw, θPitch, θHSx, θHSy) and temperature data Temp through a sensor, and defocus amount data defocus_amount from the lens focus data θHSz and the frequency component of the image.

The camera module 1000 may output stabilization data using an ANN model trained to infer stabilization data for image stabilization and focus adjustment based on the obtained tremor detection data, temperature data, lens focus data, and defocus amount data.

Hereinafter, a method for image stabilization in the camera module will be described with reference to FIG. 15, which illustrates a method for image stabilization in a camera module in an example of the present disclosure. Operations to be described later in the presented example may be performed by the processor 140 of the camera module 1000.

Figure 15:
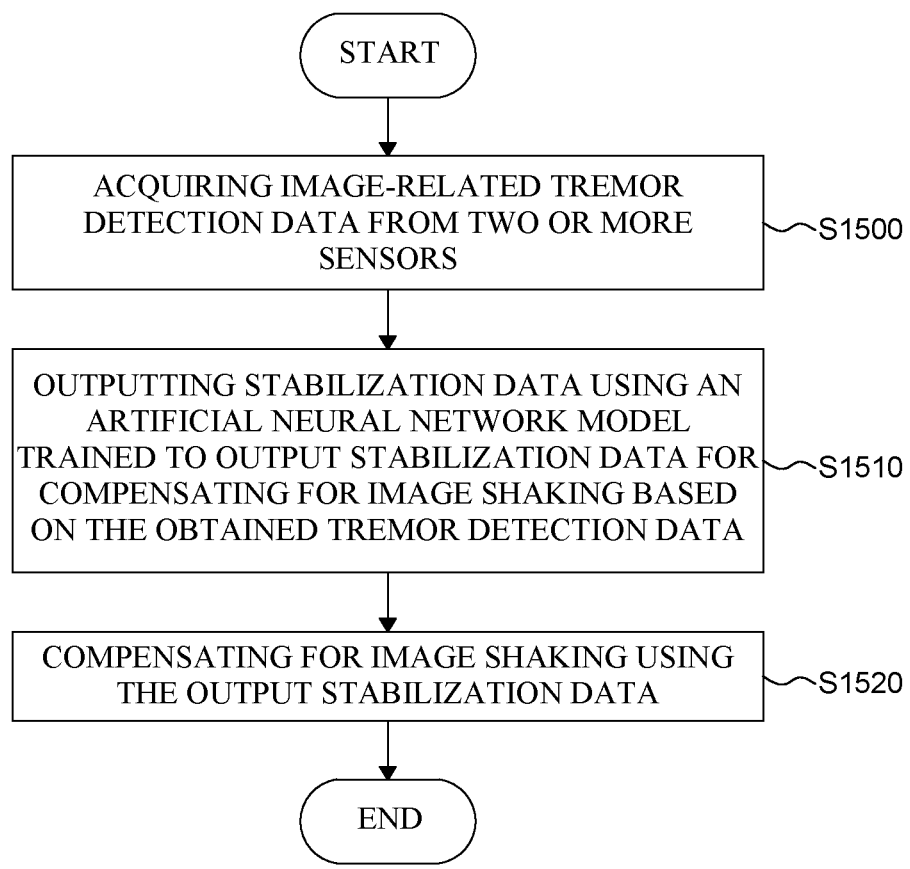
FIG. 15 is a flowchart illustrating a method for image stabilization in a camera module in an example of the present disclosure.

Referring to FIG. 15, the processor 140 acquires image-related tremor detection data from two or more sensors (S1500). The two or more sensors according to an example of the present disclosure may include two or more of a gyro sensor, a Hall sensor, and a photo sensor. Here, the tremor detection data may include a signal detected by the x-axis and y-axis rotational movement of the gyro sensor and the x-axis and y-axis rotational movement of the Hall sensor.

The processor 140 outputs stabilization data using an ANN model trained to output stabilization data for compensating for image shaking based on the obtained tremor detection data (S1510).

Next, the processor 140 compensates for image shaking using the output stabilization data (S1520).

Figure 16:
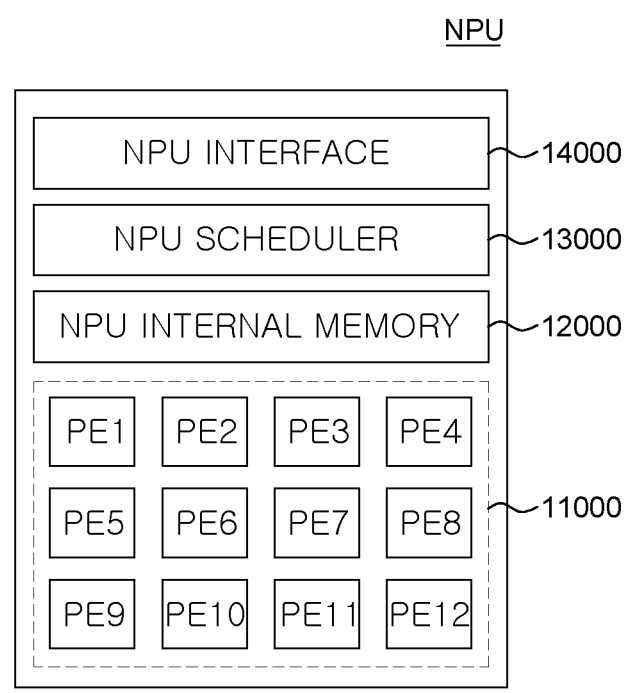
FIG. 16 is a schematic conceptual diagram illustrating a neural processing unit according to the present disclosure.

FIG. 16 illustrates a neural processing unit according to the present disclosure.

The neural processing unit (NPU) shown in FIG. 16 is a processor specialized to perform an operation for an artificial neural network.

An artificial neural network refers to a network of artificial neurons that multiplies and adds weights when multiple inputs or stimuli are received, and transforms and transmits the value added with an additional deviation through an activation function. The trained artificial neural network can be used to output inference results from input data.

The NPU may be a semiconductor implemented as an electric/electronic circuit. The electric/electronic circuit may include number of electronic devices (e.g., a transistor and a capacitor).

The NPU may include a processing element (PE) array 11000, an NPU internal memory 12000, an NPU scheduler 13000, and an NPU interface 14000. Each of the plurality of processing elements 11000, the NPU internal memory 12000, the NPU scheduler 13000, and the NPU interface 14000 may be a semiconductor circuit to which numerous transistors are connected. Therefore, some transistors may be difficult to identify and distinguish with the naked eye, and may be identified only by an operation.

The NPU may be configured to infer a first model (e.g., Actor model).

For example, a specific circuit may operate as the plurality of processing elements 11000, or may operate as the NPU scheduler 13000. The NPU scheduler 13000 may be configured to perform the function of the controller configured to control the artificial neural network inference operation of the NPU.

The NPU may include a plurality of processing elements 11000, an NPU internal memory 12000 configured to store an artificial neural network model that can be inferred by the plurality of processing elements 11000, and a NPU scheduler 13000 configured to control the plurality of processing elements 11000 and the NPU internal memory 12000 based on the data locality information or information about the structure of the artificial neural network model. Here, the artificial neural network model may include information on data locality information or structure of the artificial neural network model. The artificial neural network model may refer to an AI recognition model trained to perform a specific inference function.

The plurality of processing elements 11000 may perform an operation for an artificial neural network.

The NPU interface 14000 may communicate with various elements connected to the NPU through a system bus, for example, a memory.

The NPU scheduler 13000 may be configured to control the operation of the plurality of processing elements 11000 for the inference operation of the neural processing unit and the sequence of the read operation and the write operation of the NPU internal memory 12000.

The NPU scheduler 13000 may be configured to control the plurality of processing elements 11000 and the NPU internal memory 12000 based on the data locality information or information about the structure of the artificial neural network model.

The NPU scheduler 13000 may analyze the structure of the artificial neural network model to be operated in the plurality of processing elements 11000 or may receive the pre-analyzed information. For example, the data of the artificial neural network that can be included in an artificial neural network model may include at least a portion of node data (i.e., feature map) of each layer, arrangement data of layers, locality information or structure information, and weight data of each connection network (i.e., weight kernel) connecting nodes of each layer. The data of the artificial neural network may be stored in a memory provided inside the NPU scheduler 13000 or the NPU internal memory 12000.

The NPU scheduler 13000 may schedule the operation sequence of the artificial neural network model to be performed by the NPU based on the data locality information or the structure information of the artificial neural network model.

The NPU scheduler 13000 may acquire a memory address value in which the feature map and weight data of the layer of the artificial neural network model are stored based on the data locality information or the structure information of the artificial neural network model. For example, the NPU scheduler 13000 may obtain a memory address value in which the feature map and weight data of the layer of the artificial neural network model stored in the memory are stored. Therefore, the NPU scheduler 13000 may transmit the feature map and weight data of the layer of the artificial neural network model to be driven from the memory and store it in the NPU internal memory 12000.

The feature map of each layer may have a corresponding memory address value, respectively.

Each weight data may have a corresponding memory address value, respectively.

The NPU scheduler 13000 may schedule an operation sequence of the plurality of processing elements 11000 based on the data locality information or the information about the structure of the artificial neural network model, for example, the data locality information of layout of layers of the artificial neural network model or the information about the structure of the artificial neural network model.

The NPU scheduler 13000 may schedule based on the data locality information or the information about the structure of the artificial neural network model so that the NPU scheduler may operate in a different way from a scheduling concept of a normal CPU. The scheduling of the normal CPU operates to provide the highest efficiency in consideration of fairness, efficiency, stability, and reaction time. That is, the normal CPU schedules to perform the most processing during the same time in consideration of a priority and an operation time.

A conventional CPU uses an algorithm which schedules a task in consideration of data such as a priority or an operation processing time of each processing. In contrast, the NPU scheduler 13000 may determine a processing sequence based on the data locality information or the information about the structure of the artificial neural network model.

Moreover, the NPU scheduler 13000 may operate the NPU according to the determined processing sequence based on the data locality information or the information about the structure of the artificial neural network model and/or data locality information or information of a NPU.

However, the present disclosure is not limited to the data locality information or the information about the structure of the NPU.

NPU scheduler 13000 may be configured to store information about the data locality information or structure of the artificial neural network model.

That is, the NPU scheduler 13000 may determine the processing sequence even if only information on the data locality information or structure of the artificial neural network model is provided.

Furthermore, the NPU scheduler 13000 may determine the processing sequence of the NPU in consideration of the information on the data locality information or structure of the artificial neural network model and the data locality information or information on the structure of the NPU. In addition, it is also possible to optimize the processing of the NPU in the determined processing sequence.

The plurality of processing elements 11000 may refer to a configuration in which a plurality of processing elements PE1 to PE12 configured to calculate the feature map and weight data of the artificial neural network are disposed. Each processing element may include a multiply and accumulate (MAC) operator and/or an Arithmetic Logic Unit (ALU) operator. However, examples according to the present disclosure are not limited thereto.

Each processing element may be configured to optionally further include an additional special function unit for processing the additional special function.

For example, it is also possible for the processing element PE to be modified and implemented to further include a batch-normalization unit, an activation function unit, an interpolation unit, and the like.

Although FIG. 16 illustrates a plurality of processing elements, it is also possible to configure operators implemented as a plurality of multipliers and adder trees to be arranged in parallel by replacing the MAC in one processing element. In this case, the plurality of processing elements 11000 may be referred to as at least one processing element including a plurality of operators.

The plurality of processing elements 11000 is configured to include a plurality of processing elements PE1 to PE12. The plurality of processing elements PE1 to PE12 illustrated in FIG. 16 is merely an example for convenience of description, and the number of the plurality of processing elements PE1 to PE12 is not limited thereto. The size or number of the processing element array may be determined by the number of the plurality of processing elements PE1 to PE12. The size of the processing element array may be implemented in the form of an N×M matrix. Here, N and M are integers greater than zero. The processing element array may include N×M processing elements. That is, there may be at least one processing elements.

The size of the plurality of processing elements 11000 may be designed in consideration of the characteristics of the artificial neural network model in which the NPU operates.

The plurality of processing elements 11000 may be configured to perform functions such as addition, multiplication, and accumulation required for an artificial neural network operation. In other words, the plurality of processing elements 11000 may be configured to perform a multiplication and accumulation (MAC) operation.

According to various examples of the present disclosure, the artificial neural network model may be trained based on the reinforcement learning technique.

According to various examples of the present disclosure, the tremor detection data may include a signal for detecting a change in the position of the camera module and the lens.

According to various examples of the present disclosure, the artificial neural network model may be trained according to the tremor detection data such that an error value due to the image shaking approaches a predetermined value. Here, the error value may be based on a difference between the x-axis movement of the gyro sensor and the x-axis movement of the hall sensor and a difference between the y-axis movement of the gyro sensor and the y-axis movement of the hall sensor.

According to various examples of the present disclosure, the artificial neural network model may output a control signal for controlling a movement of a lens included in a camera module to compensate for the image shaking by receiving the tremor detection data as an input.

According to various examples of the present disclosure, the artificial neural network model may output a control signal for controlling a movement of an image sensor included in a camera module to compensate for the image shaking by receiving the tremor detection data as an input.

According to various examples of the present disclosure, the trained model may include a first model trained to infer the stabilization data in which the error value approaches the predetermined value based on the tremor detection data, and a second model trained to criticize the result of the stabilization data.

According to various examples of the present disclosure, the artificial neural network model may simultaneously perform training for inferring stabilization data by inputting tremor detection data as an input and inferring the stabilization data.

According to various examples of the present disclosure, the artificial neural network model may include an input node to which tremor detection data is input, a hidden layer performing an AI operation (e.g., convolutional operation), and an output node to output stabilization data.

According to various examples, the processor 140 may be configured to collect the error value through the training and update the artificial neural network model using the collected error value.

According to various examples of the present disclosure, the camera module may include a temperature sensor for sensing a temperature and the processor 140 may be configured to output the stabilization data using the artificial neural network model based on the tremor detection data and a temperature data acquired through the temperature sensor.

According to various examples of the present disclosure, the tremor detection data may include a signal detected by an x-axis and y-axis rotational movement of a gyro sensor and an x-axis, y-axis and z-axis rotational movement of a hall sensor and the processor 140 may be configured to obtain a defocus amount data from a frequency component of the image, and output the stabilization data using the artificial neural network model based on the tremor detection data and the defocus amount data.

According to various examples of the present disclosure, the artificial neural network model may use a modulation transfer function (MTF) data of the image as a training data for training. The MTF data may be data obtained by quantifying the amount of defocus.

The examples illustrated in the specification and the drawings are merely provided to facilitate the description of the subject matter of the present disclosure and to provide specific examples to aid the understanding of the present disclosure and it is not intended to limit the scope of the present disclosure. It is apparent to those of ordinary skill in the art to which the present disclosure pertains in which other modifications based on the technical spirit of the present disclosure can be implemented in addition to the examples disclosed herein.

[National R&D Project Supporting This Invention]
[Task Identification Number] 1711152858
[Task Number] 2020-0-01297-003
[Name of Ministry] Ministry of Science and ICT
[Name of Project Management (Specialized) Institution] Institute of Information & Communications Technology Planning & Evaluation
[Research Project Title] Next-generation Intelligent Semiconductor Technology Development (Design)(R&D)
[Research Task Title] Technology Development of a Deep Learning Processor Advanced to Reuse Data for Ultra-low Power Edge
[Contribution Rate] 1/1
[Name of Organization Performing the Task] DeepX Co., Ltd.
[Research Period] 2022.01.01~2022.12.31

What is claimed is:

1. A processor for stabilizing an image based on artificial intelligence (AI), the processor comprising:
    at least one processing element; and
    at least one memory electrically coupled to the at least one processing element,
    wherein the processor is configured to receive tremor detection data, and output stabilization data for compensating for shaking of the image,
    wherein the tremor detection data is acquired from two or more sensors, and
    wherein the stabilization data is outputted using an artificial neural network (ANN) model trained to output the stabilization data based on the tremor detection data.

2. The processor of claim 1, wherein the ANN model is trained based on reinforcement learning.

3. The processor of claim 1, wherein virtual tremor detection data is provided for reinforcement learning for the ANN model.

4. The processor of claim 3, wherein the virtual tremor detection data includes at least one of a sitting pattern, a walking pattern, a running pattern, a motion pattern of a ship, a motion pattern of a car, and a motion pattern of a motorcycle.

5. The processor of claim 1, wherein the tremor detection data includes a signal for detecting position change of the two or more sensors.

6. The processor of claim 1, wherein the two or more sensors include a gyro sensor and a Hall sensor.

7. The processor of claim 1, wherein the tremor detection data includes a signal detected by an x-axis and y-axis rotational movement of the two or more sensors.

8. The processor of claim 1, wherein the processor further acquires defocus amount data of the image input to the ANN model.

9. The processor of claim 1, wherein the ANN model includes a model trained so that an error value due to the image shaking approaches a predetermined value based on training data for learning.

10. The processor of claim 1, wherein the ANN model includes:
    an input node to which the tremor detection data is input;
    a hidden layer for performing an AI operation of the input node; and
    an output node for outputting the stabilization data.

11. The processor of claim 1, wherein the processor is implemented as a system on chip (SoC) in which a central processing unit (CPU) and a neural processing unit (NPU) are integrated.

12. The processor of claim 1, wherein the processor is implemented as at least one of a central processing unit (CPU), an application processor (AP), a micro processing unit (MPU), a micro controller unit (MCU), an image signal processor (ISP) or a neural processing unit (NPU).

13. A device including:
    a lens;
    an image sensor coupled to the lens; and
    two or more sensors coupled to the lens or the image sensor; and
    a processor configured to receive tremor detection data, with respect to the lens or the image sensor, from the two or more sensors to process the tremor detection data using a trained artificial neural network (ANN) model so as to output stabilization data.

14. The device of claim 13, further comprising:
    a voice coil motor (VCM) driver configured to receive the stabilization data from the processor and output a control signal; and
    a VCM actuator configured to compensate for position of the lens or the image sensor based on the control signal.

15. The device of claim 14, wherein the VCM driver is configured to convert the stabilization data into the control signal using a conversion formula or a lookup table.

16. The device of claim 14, wherein the VCM actuator is configured to control the position of the lens or the image sensor in x-axis and/or y-axis.

* * * * *